United States Patent [19]
Yukawa

[11] Patent Number: 6,109,318
[45] Date of Patent: Aug. 29, 2000

[54] PNEUMATIC TIRE INCLUDING SEQUENCE

[75] Inventor: Naoki Yukawa, Takarazuka, Japan

[73] Assignee: Sumitomo Rubber Industries, Ltd., Hyogo-Ken, Japan

[21] Appl. No.: 08/982,473

[22] Filed: Dec. 2, 1997

[30] Foreign Application Priority Data

Dec. 4, 1996 [JP] Japan .................................. 8-324386

[51] Int. Cl.[7] .......................... B60C 11/03; B60C 113/00
[52] U.S. Cl. ..................................................... 152/209.2
[58] Field of Search ....................... 152/209 N, 209 NS, 152/209.2, 209.3

[56] References Cited

U.S. PATENT DOCUMENTS

| | | |
|---|---|---|
| 2,124,821 | 7/1938 | Hubach . |
| 2,808,867 | 10/1957 | Buddenhagen et al. . |
| 2,878,852 | 3/1959 | Lippmann et al. . |
| 4,474,223 | 10/1984 | Landers . |
| 4,503,898 | 3/1985 | Hitzky . |
| 5,314,551 | 5/1994 | Williams . |
| 5,383,506 | 1/1995 | Kogure . |
| 5,753,057 | 5/1998 | Wesolowski . |

FOREIGN PATENT DOCUMENTS

| | | |
|---|---|---|
| 268436 | 5/1988 | European Pat. Off. . |
| 0542493A1 | 5/1993 | European Pat. Off. . |
| 724972 | 8/1996 | European Pat. Off. . |
| 800935 | 10/1997 | European Pat. Off. . |
| 8-108711 | 4/1996 | Japan . |
| 8-113012 | 5/1996 | Japan . |
| 8-113013 | 5/1996 | Japan . |
| 96/05973 | 2/1996 | WIPO . |

*Primary Examiner*—Steven D. Maki
*Attorney, Agent, or Firm*—Birch, Stewart, Kolasch & Birch, LLP

[57] ABSTRACT

A pneumatic tire includes a tread portion provided with a series of design-cycles repeating in the circumference of the tire at variable pitches. The number (NP) of different kinds of pitches is at least 10. The variable pitches repeat increase and decrease alternately in one circumferential direction of the tire to define start design-cycles inclusive to the next start design-cycles from which the pitches start to increase. A series of design-cycles is composed of a series of units, each unit defined as a group of design-cycles starting from one of that start design-cycles inclusive to the next start design-cycle exclusive. The total number of units is from 4 to 20. The units consist of at least one first-unit, the number of which is 20 to 80% of the total number, at least one second-unit, the number of which is 20–80% of the total number, and optionally a third-unit, the number of which is 0 to 60% of the total number. The first unit is defined as including at least one pitch which is not less than a standard long pitch (PLa) and at least one pitch which is not more than a standard short pitch (PSa). The second unit is defined as including at least one pitch within one of the following two ranges, a range of not less than the standard long pitch (PLa) and a range of not more than the standard short pitch (PSa), but no pitch within the other range. The third unit is defined as all of the pitches therein more than the standard short pitch (PSa) and less than the standard long pitch (PLa).

5 Claims, 25 Drawing Sheets

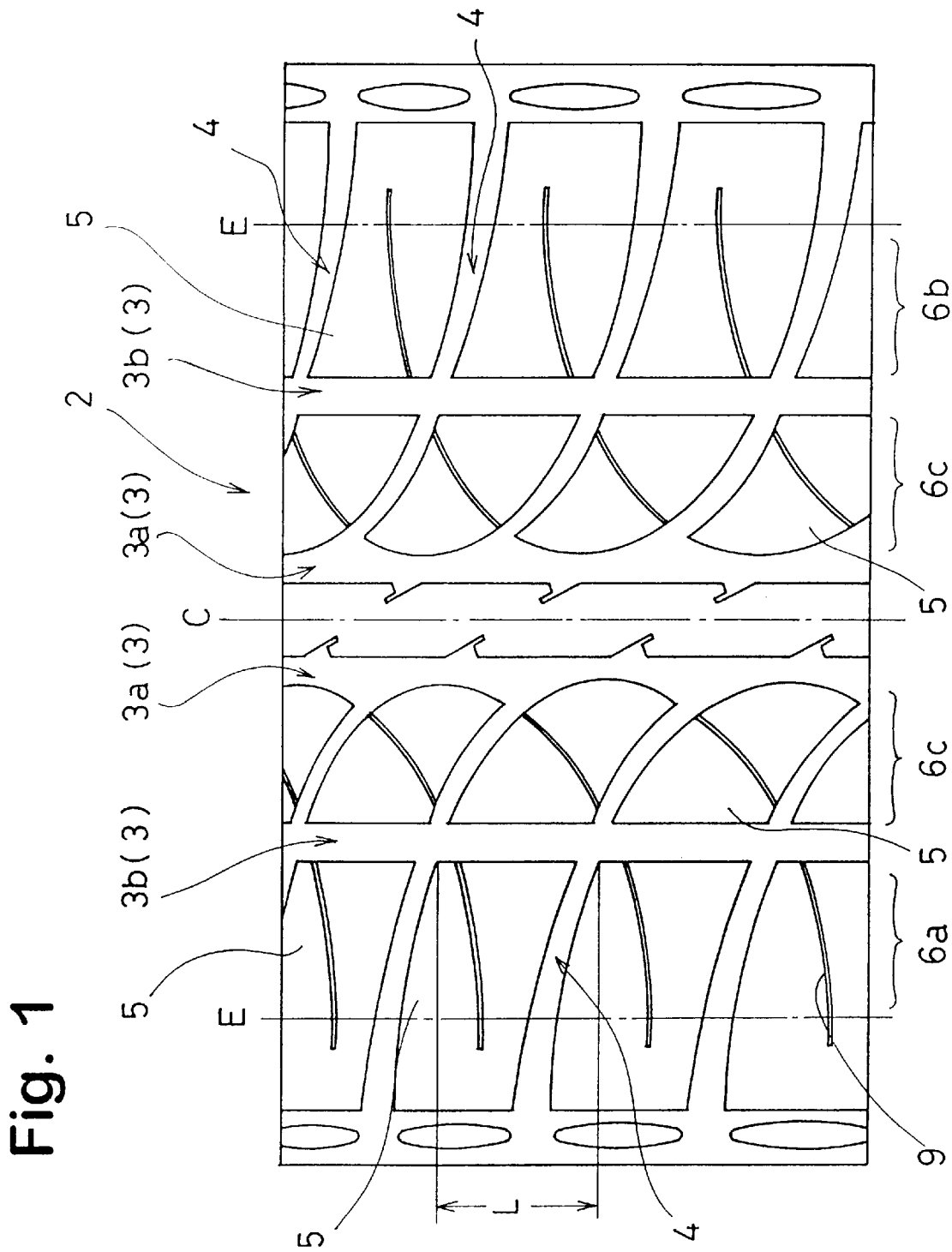

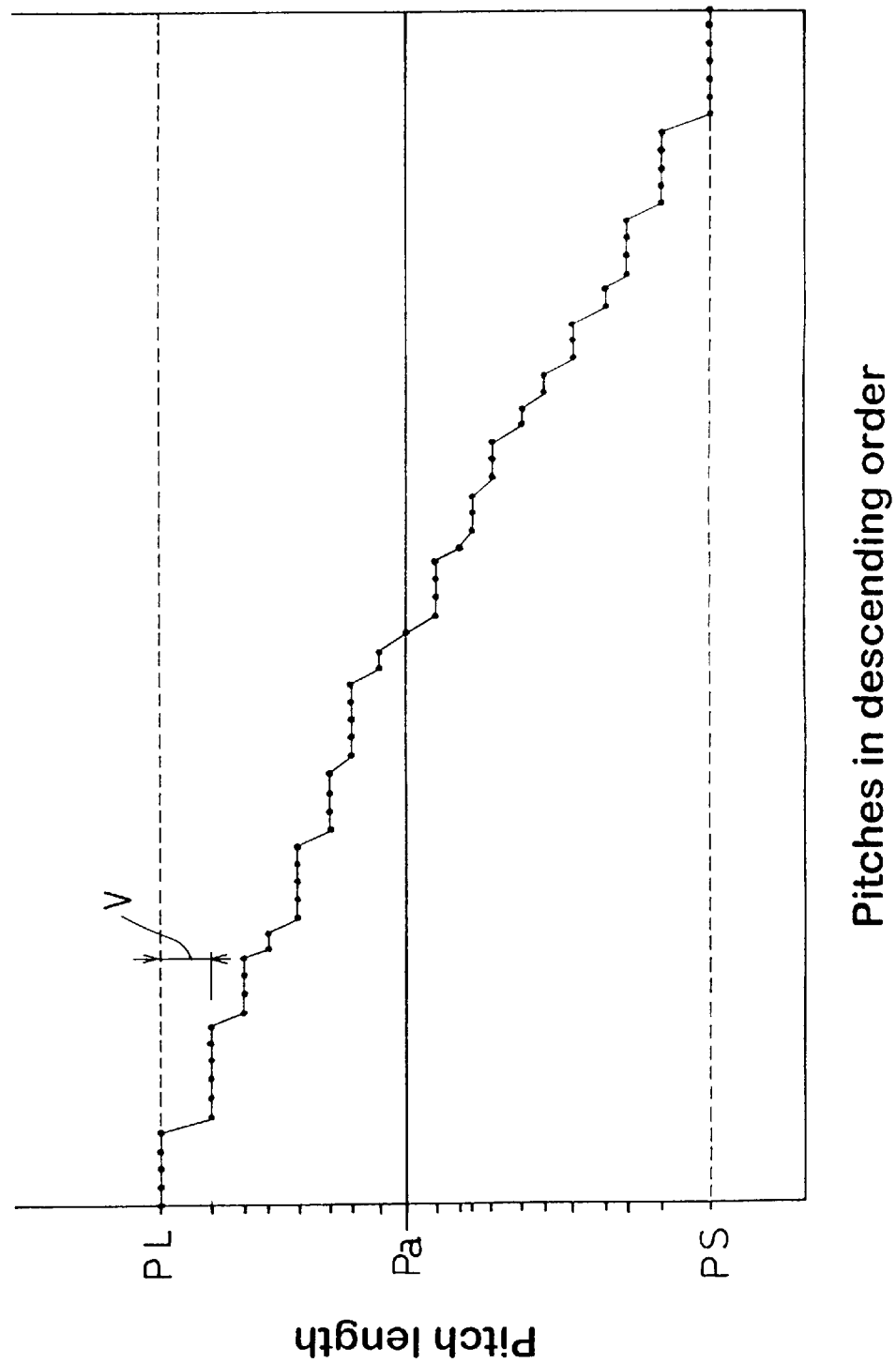

Fig. 4(A)  Ex. 1
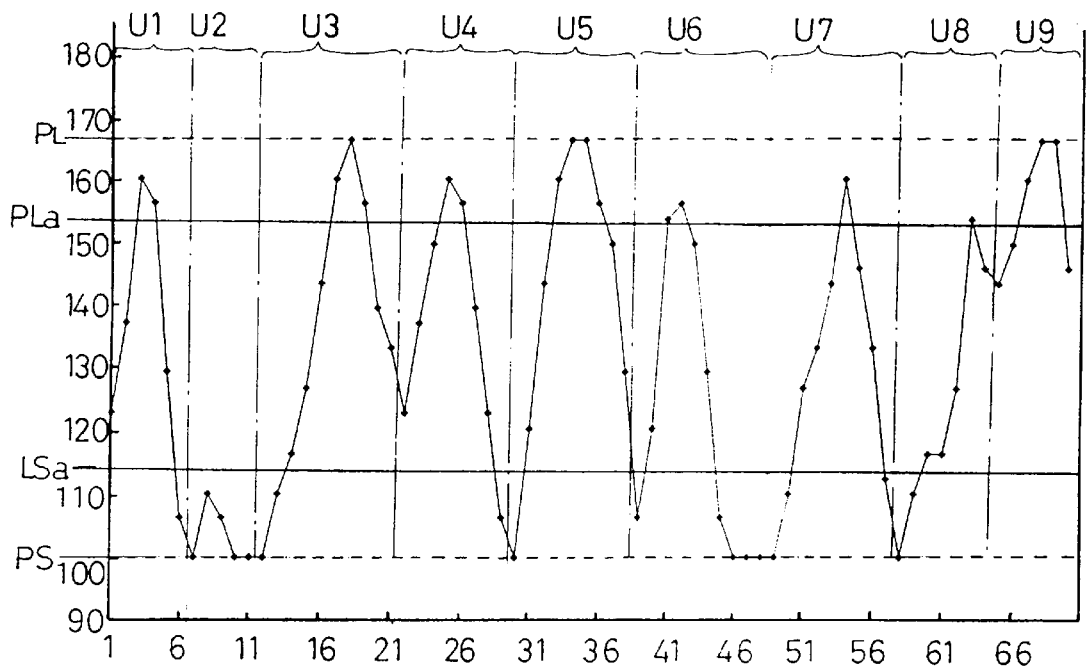
Fig. 4(B)
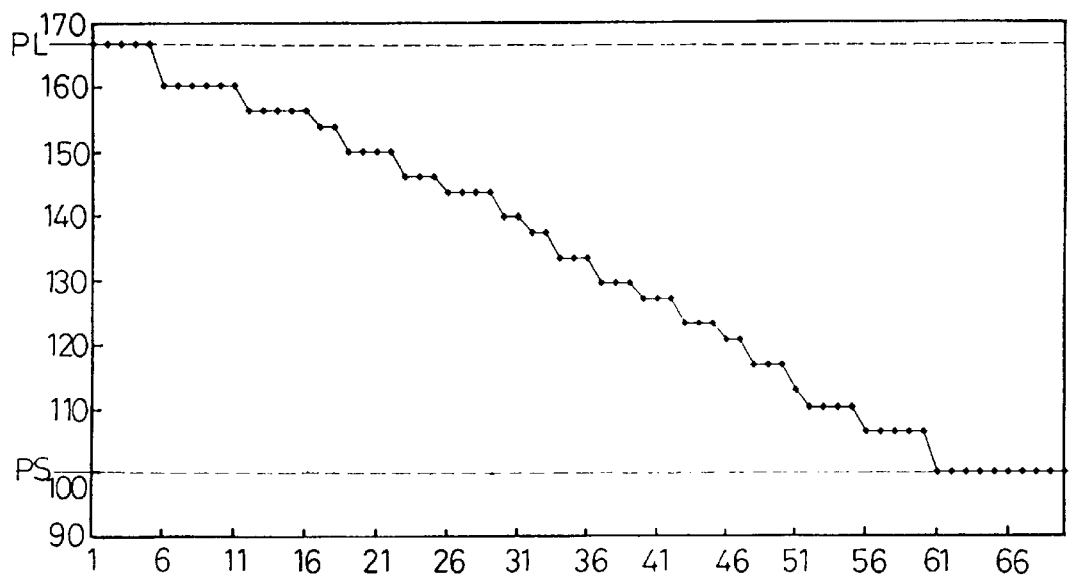

Fig. 5(A)  Ex. 2
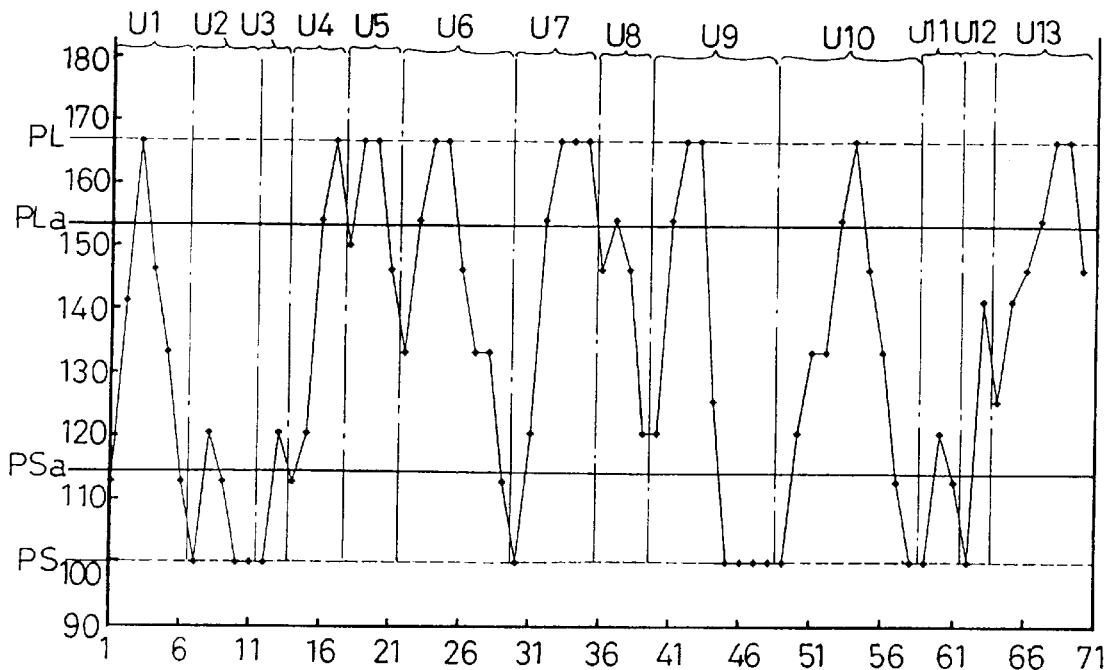
Fig. 5(B)
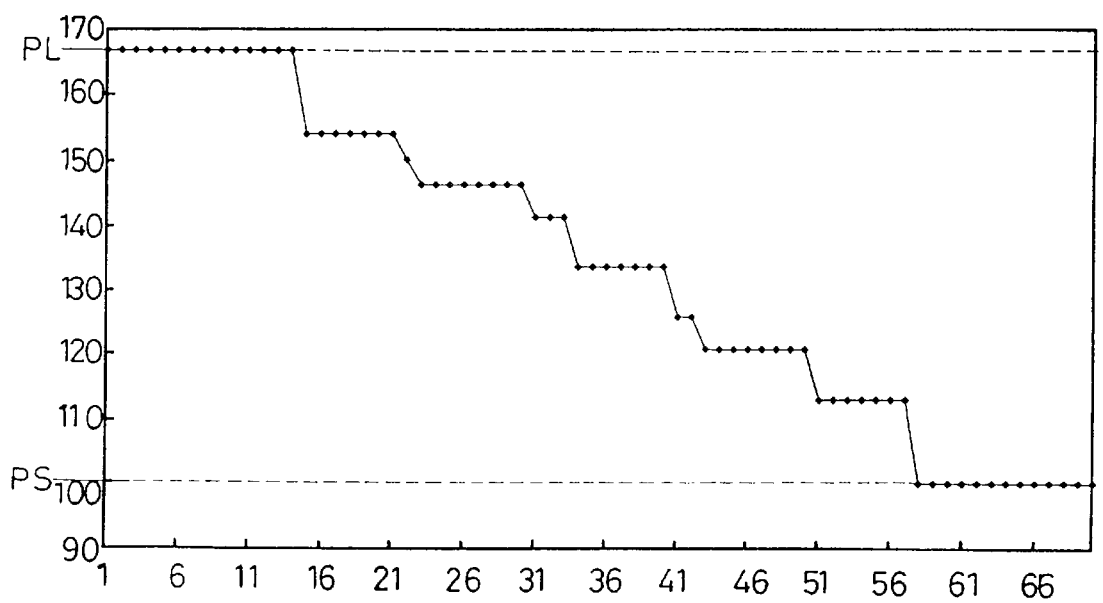

Fig. 6(A)  Ex. 3
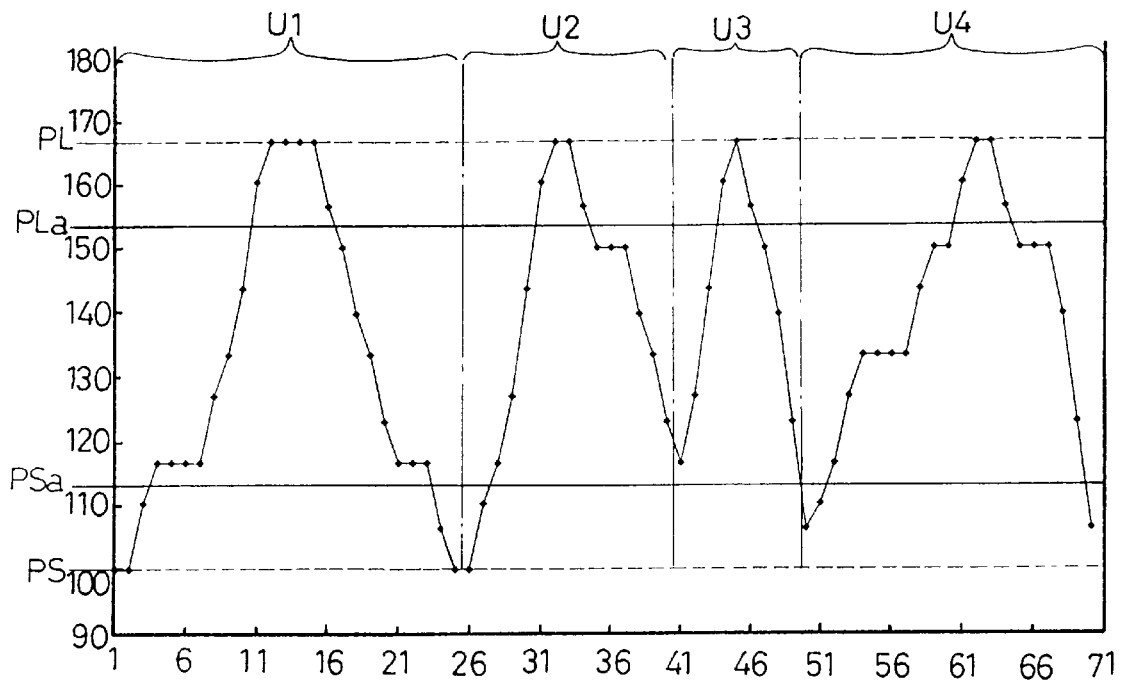
Fig. 6(B)
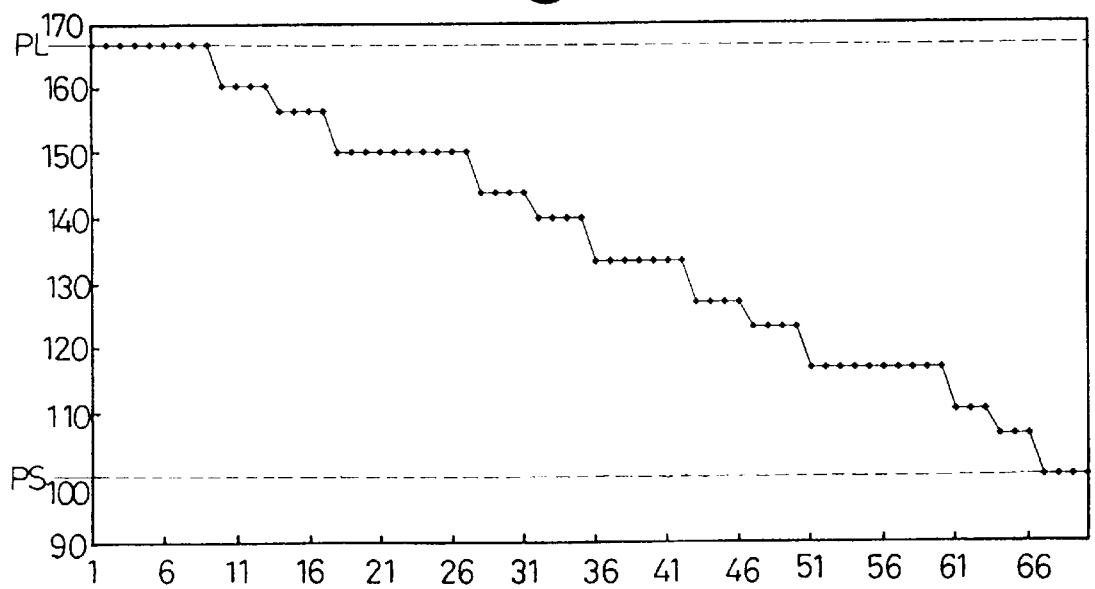

Fig. 7(A) Ex. 4
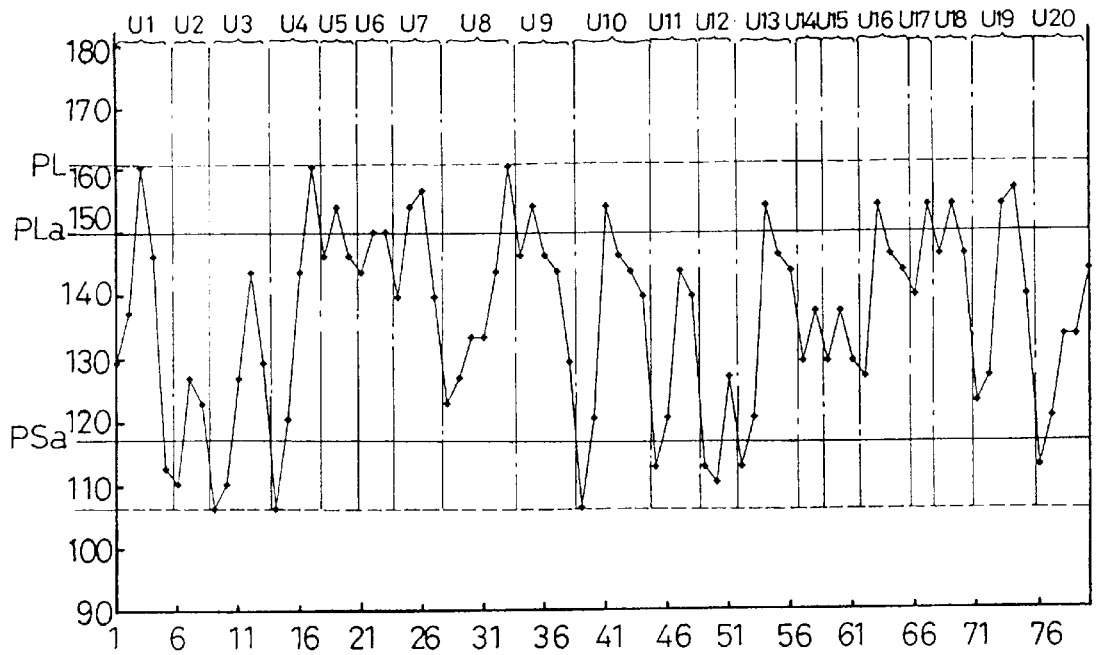
Fig. 7(B)
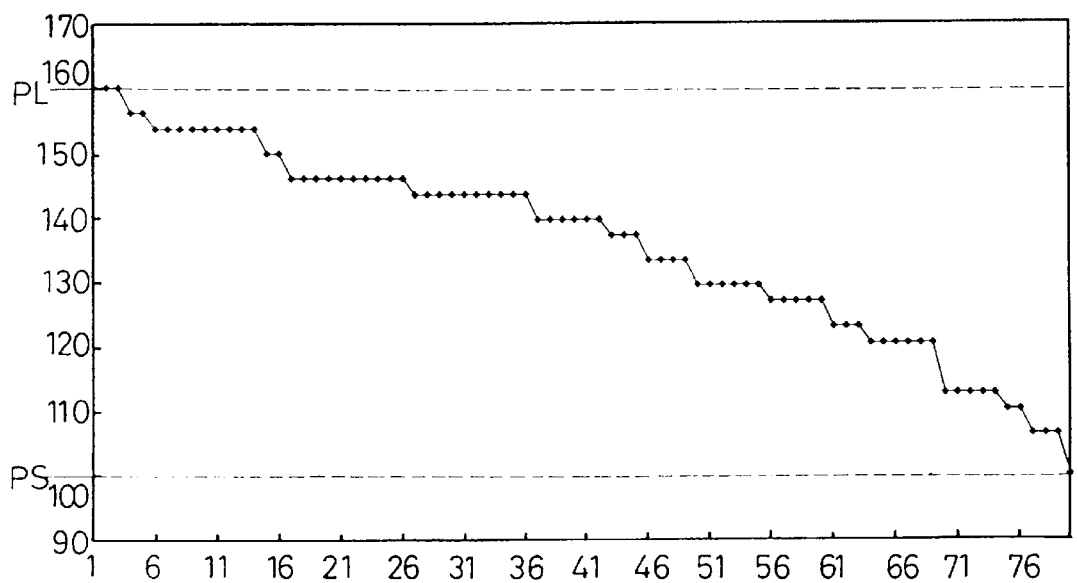

Fig. 8(A) Ex. 5
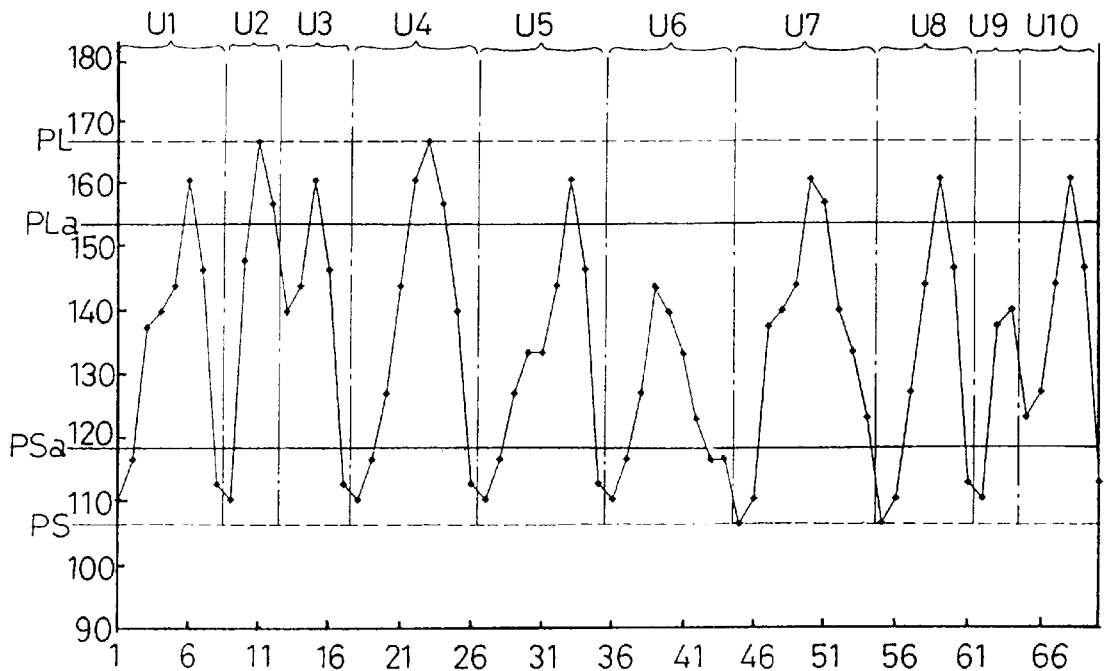
Fig. 8(B)
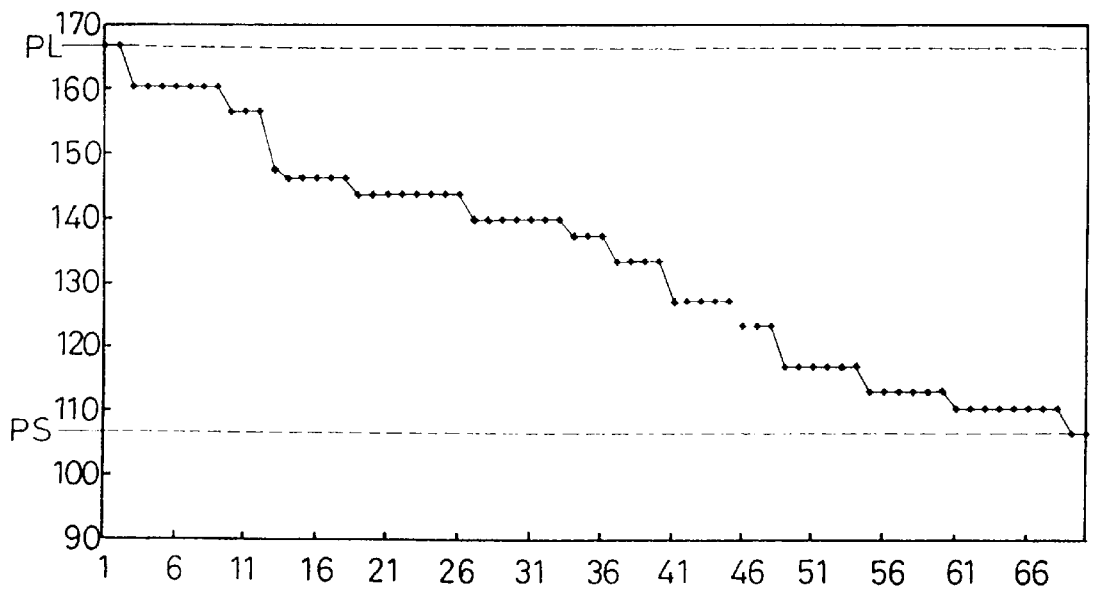

Fig. 9(A) Ex. 6
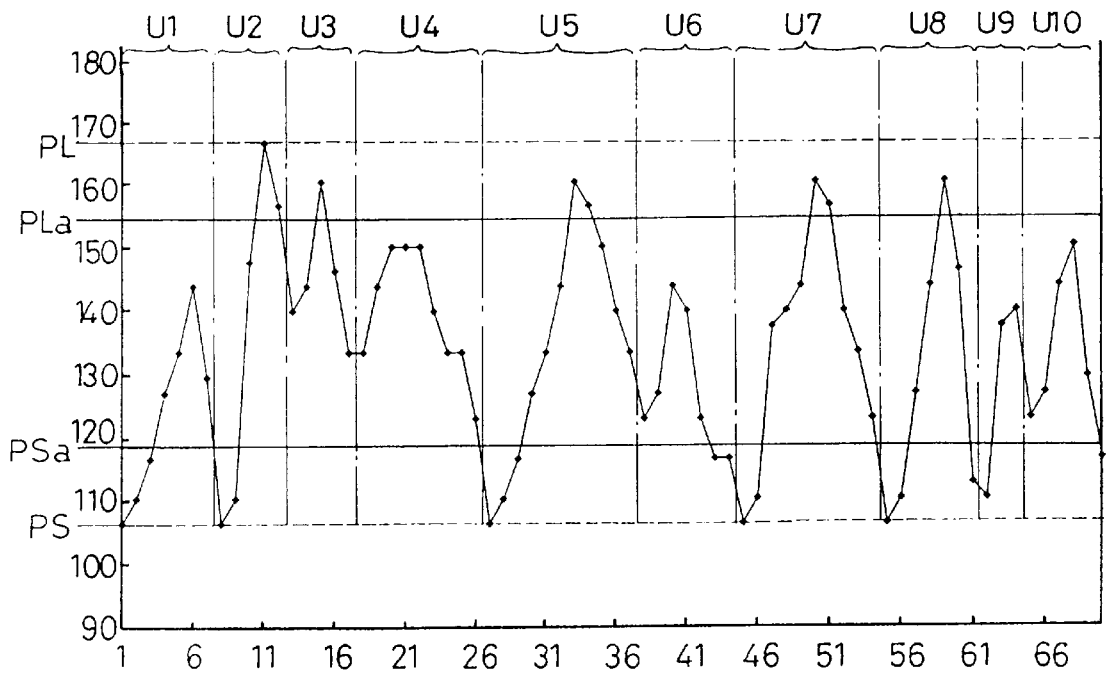
Fig. 9(B)
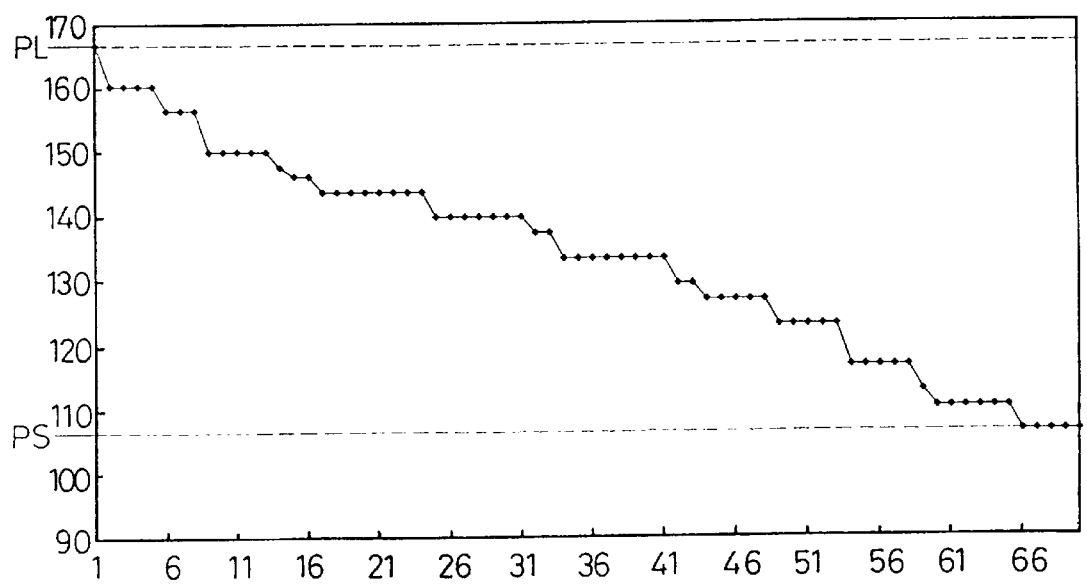

Fig. 10(A) Ex. 7
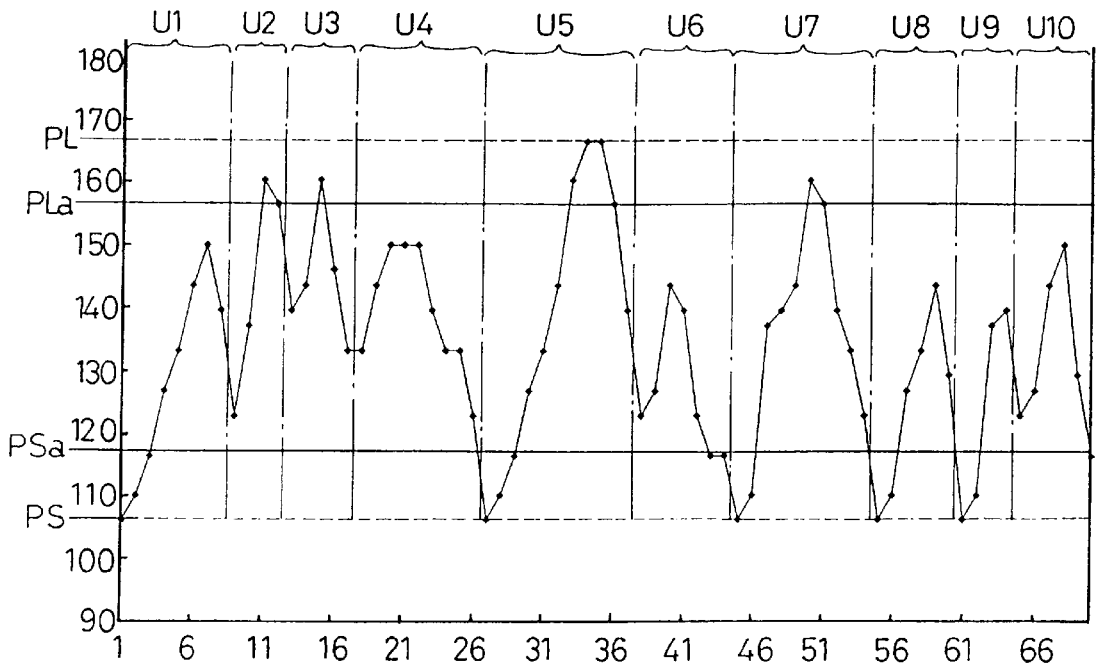
Fig. 10(B)
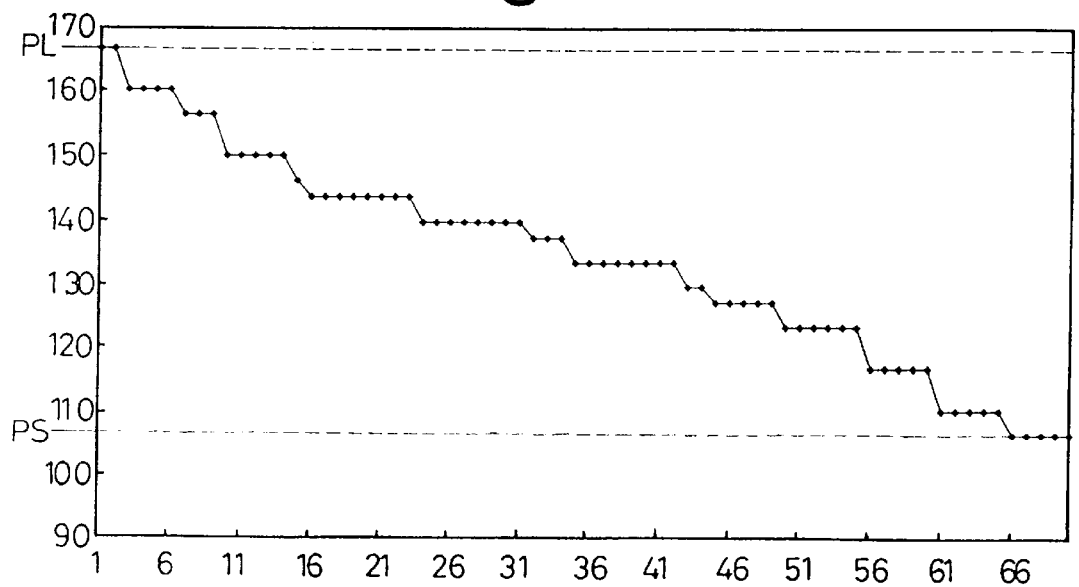

Fig. 11(A) Ex. 8
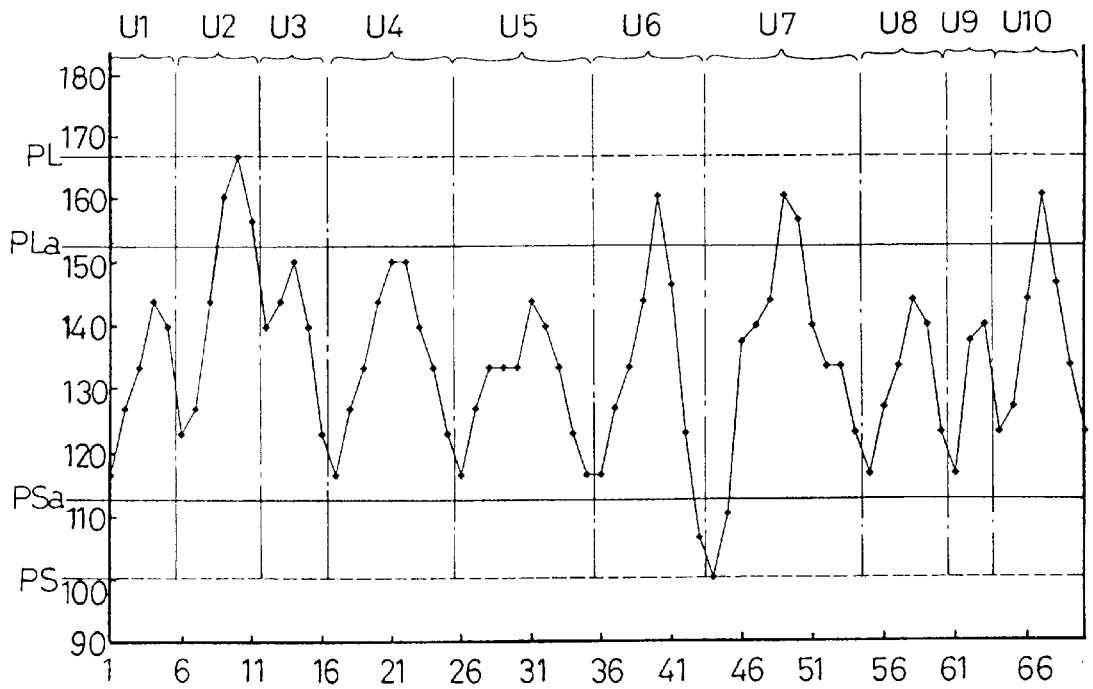
Fig. 11(B)
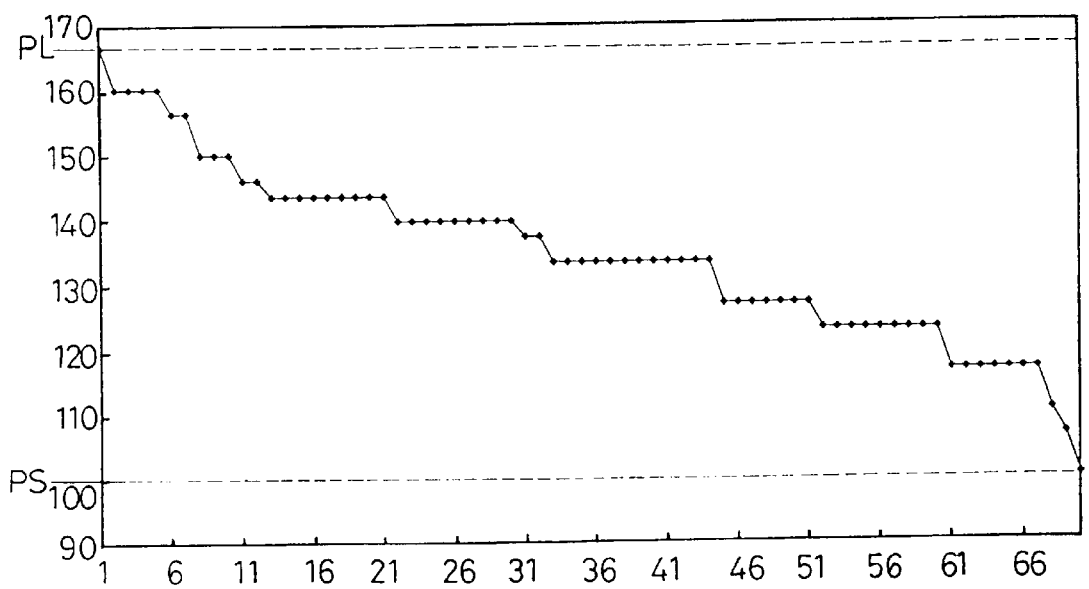

Fig. 12(A) Ex. 9
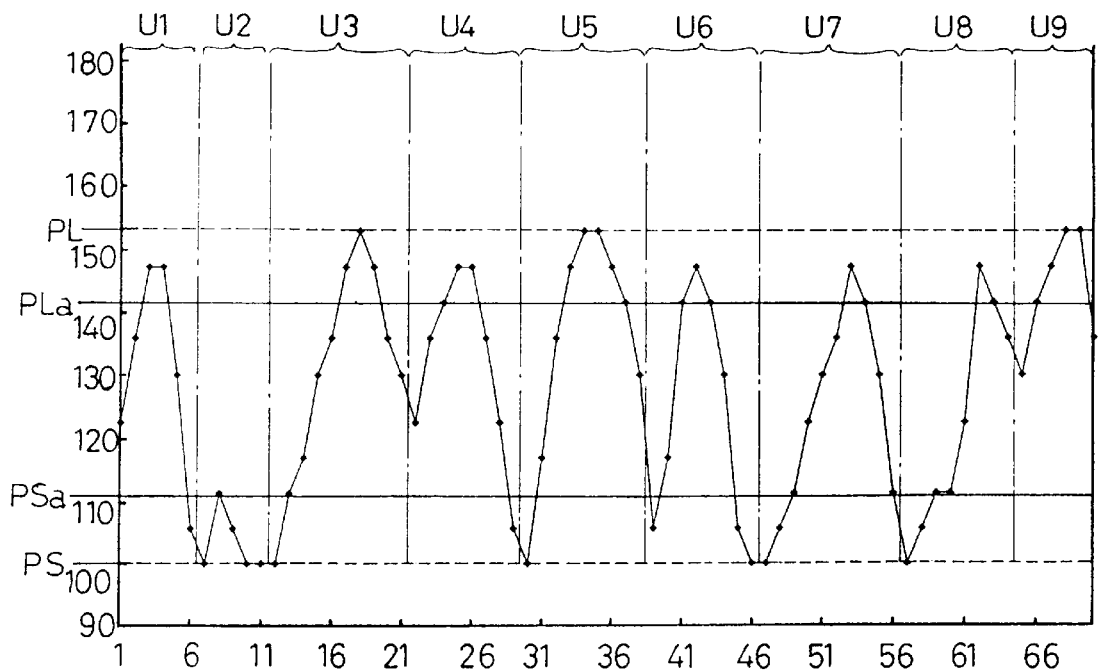
Fig. 12(B)
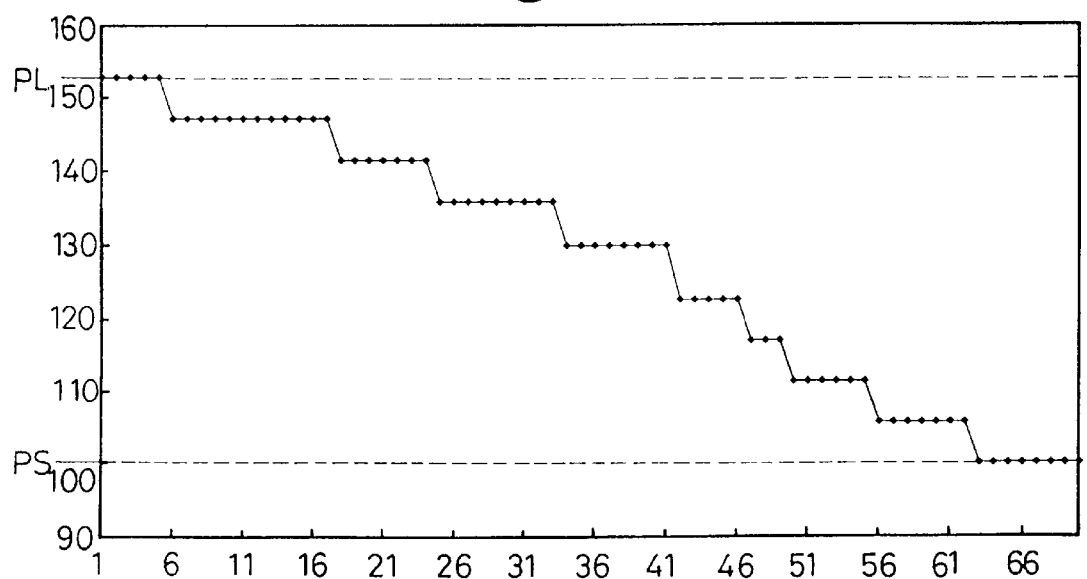

Fig. 13(A)  Ex. 10
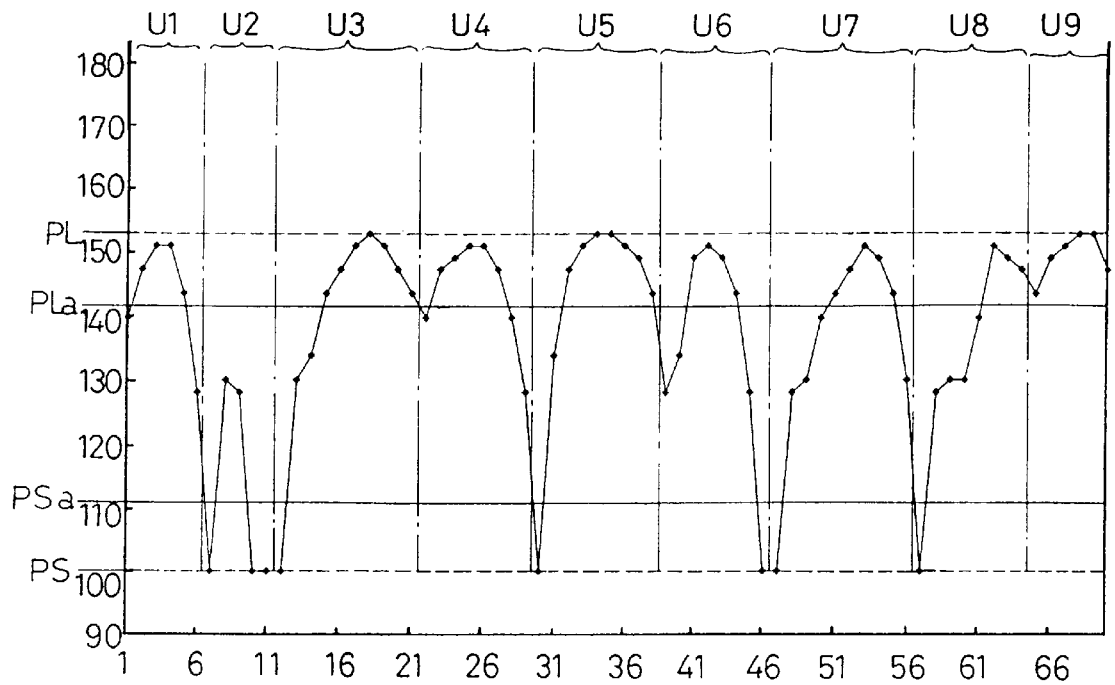
Fig. 13(B)
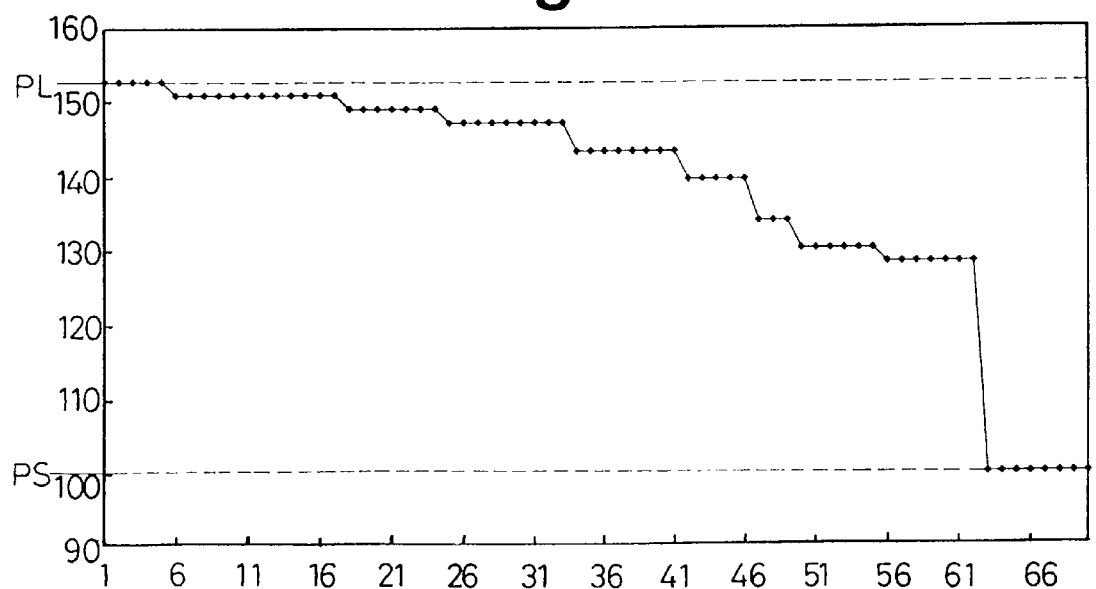

Fig. 14(A) Ex. 11
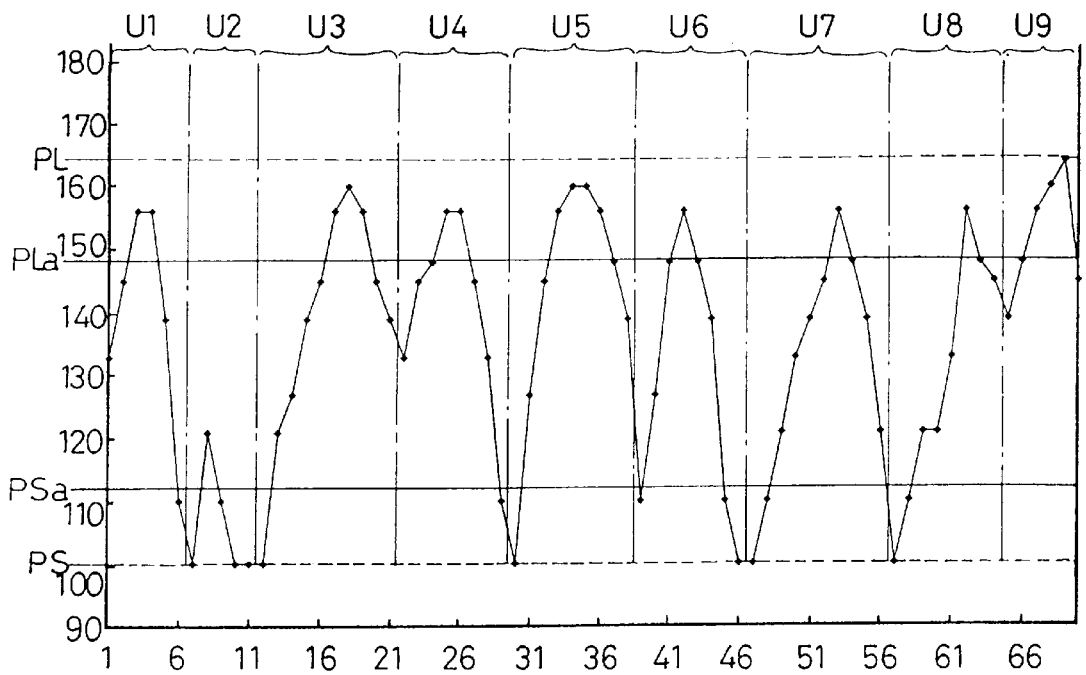
Fig. 14(B)
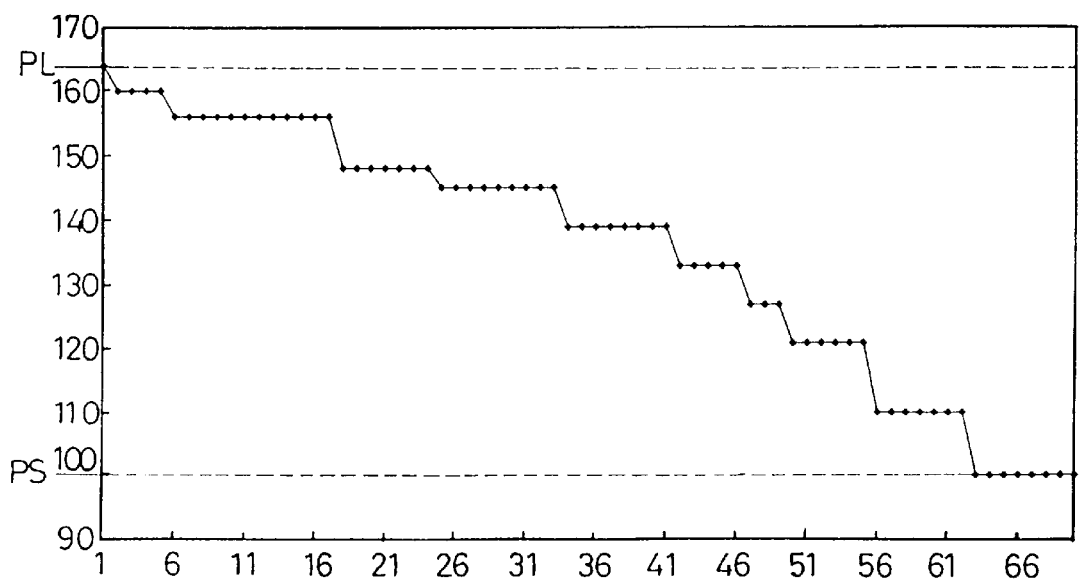

Fig. 15(A)  Ex. 12
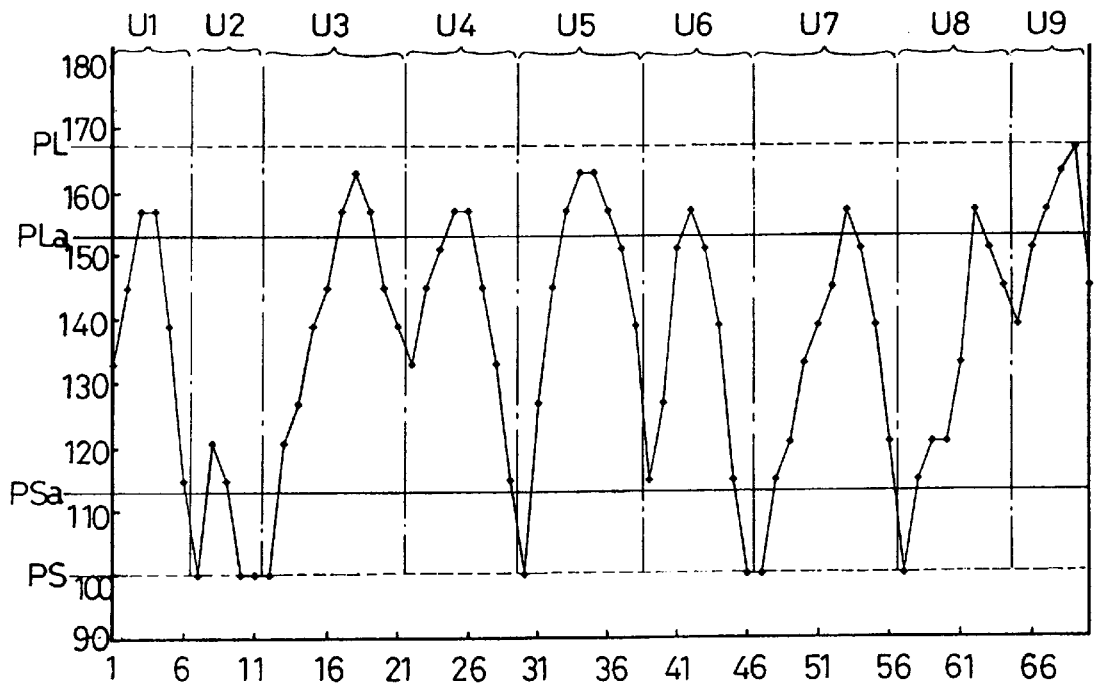
Fig. 15(B)
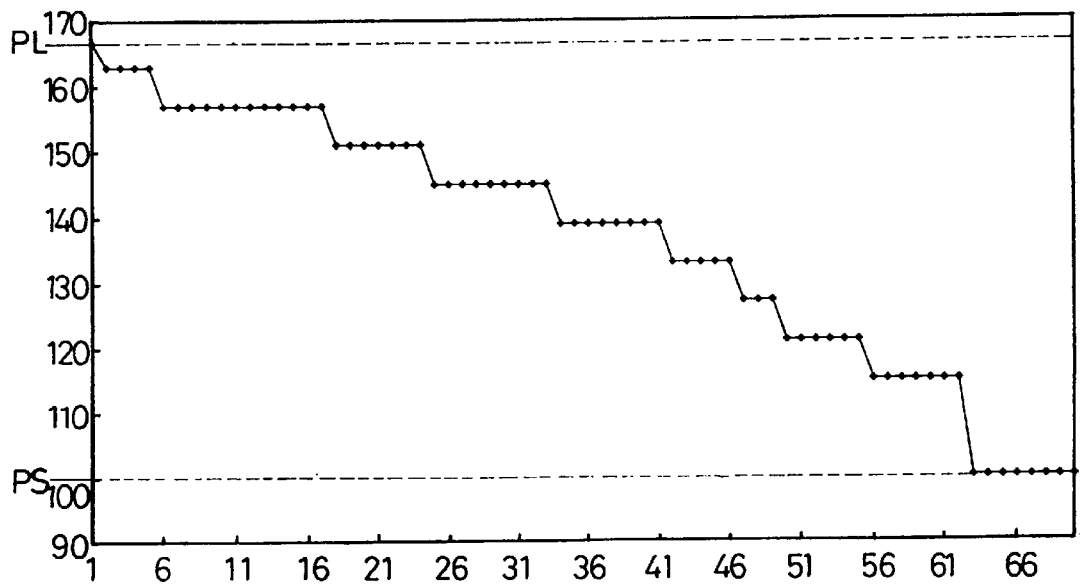

Fig. 16(A) Ex. 13
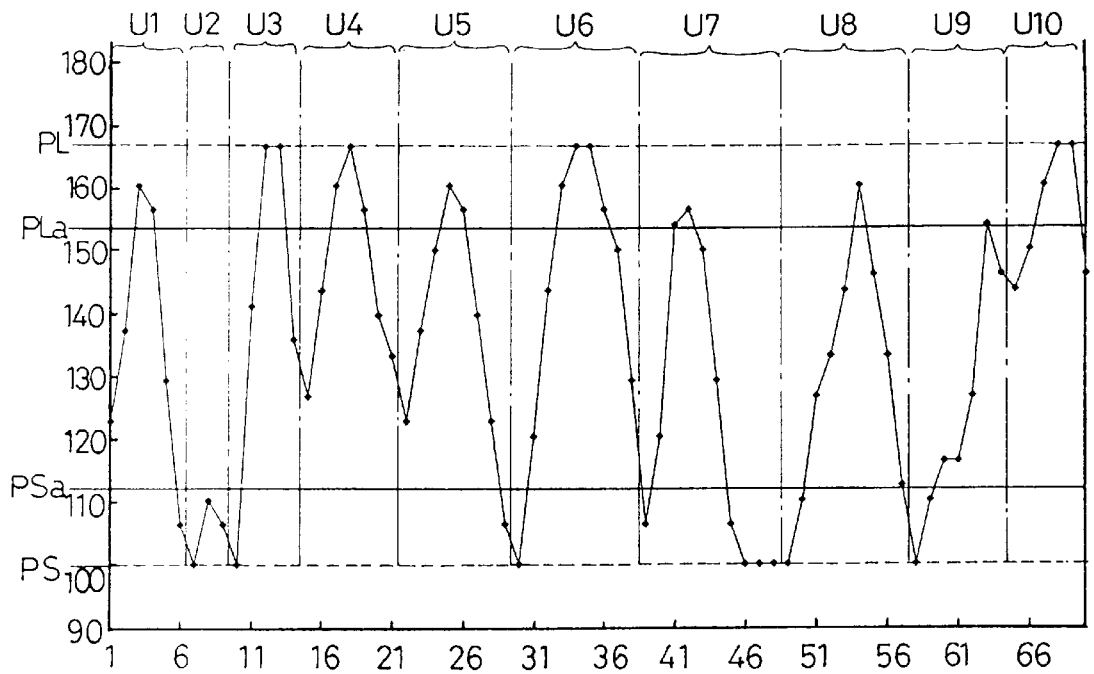
Fig. 16(B)
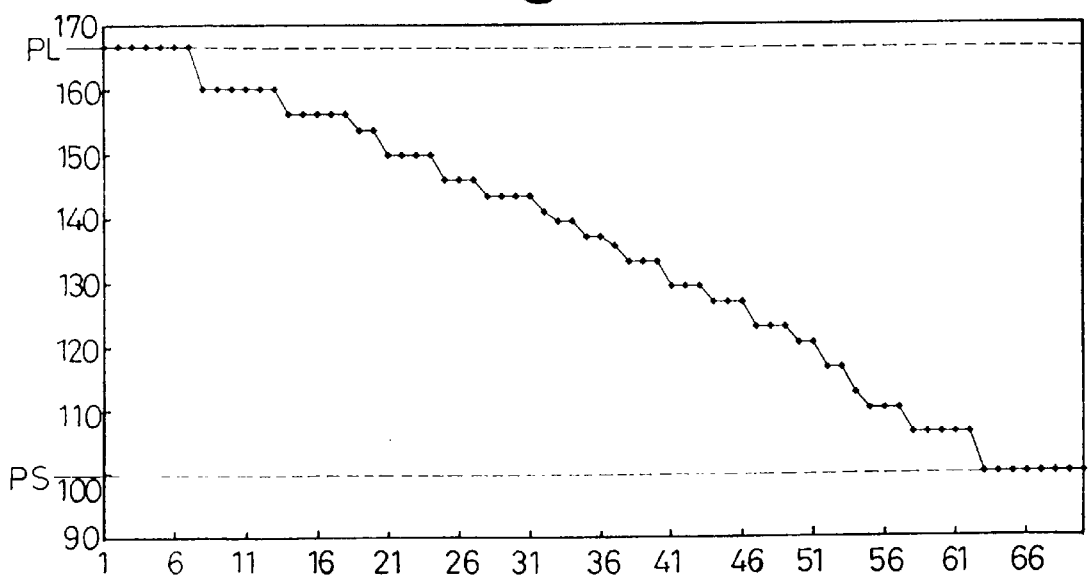

Fig. 17(A) Ex. 14
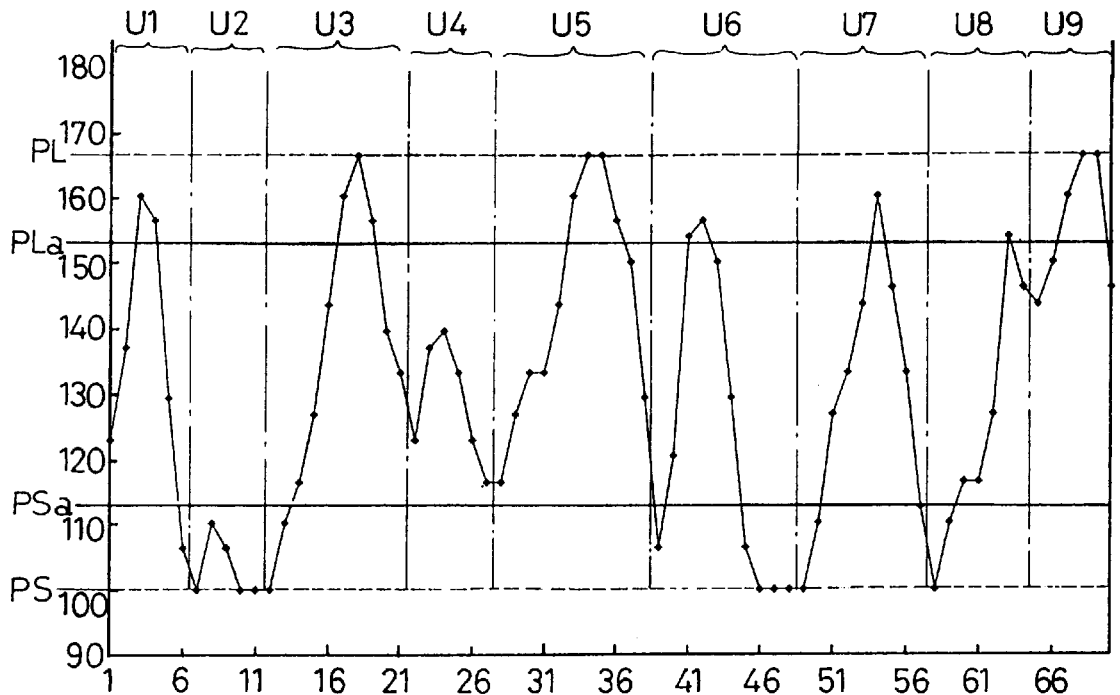
Fig. 17(B)
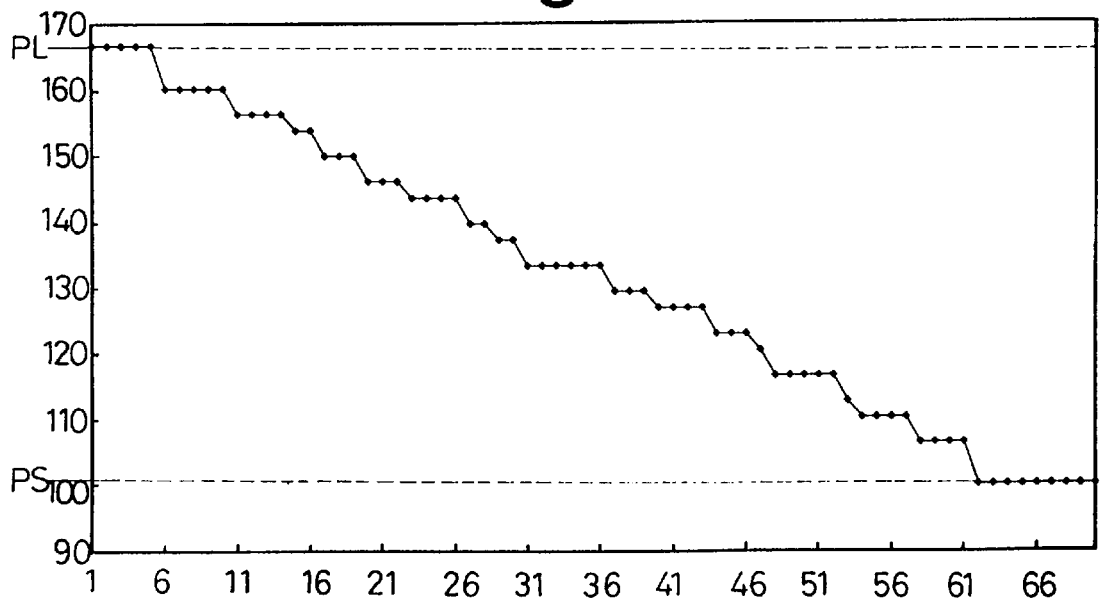

Fig. 18(A) Ex. 15
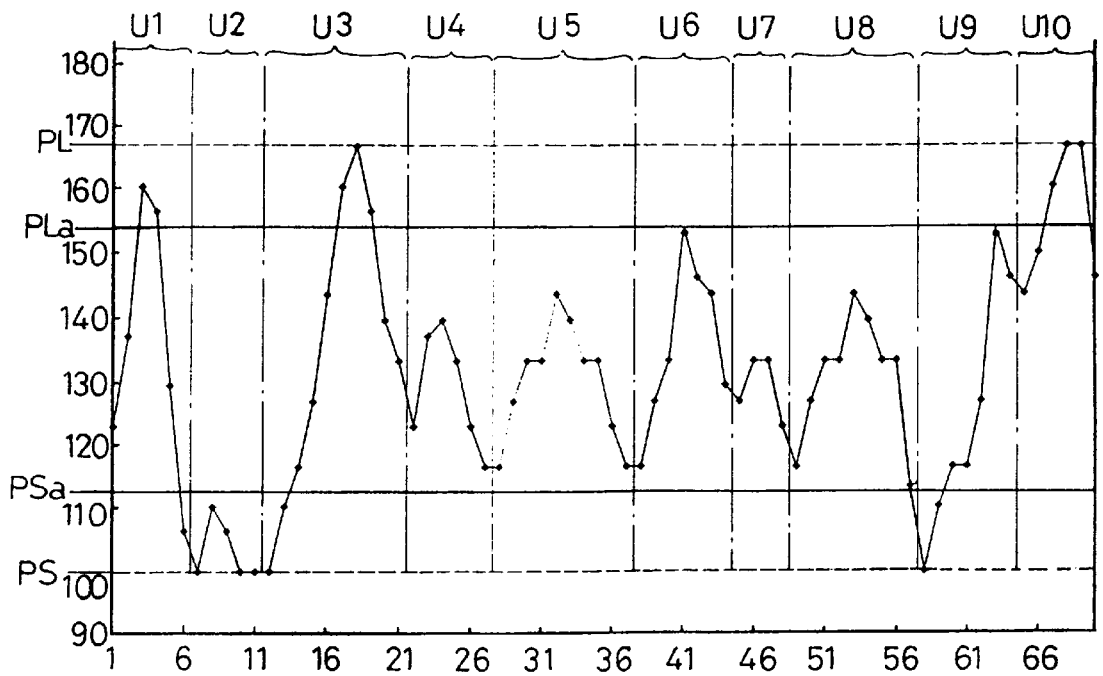
Fig. 18(B)
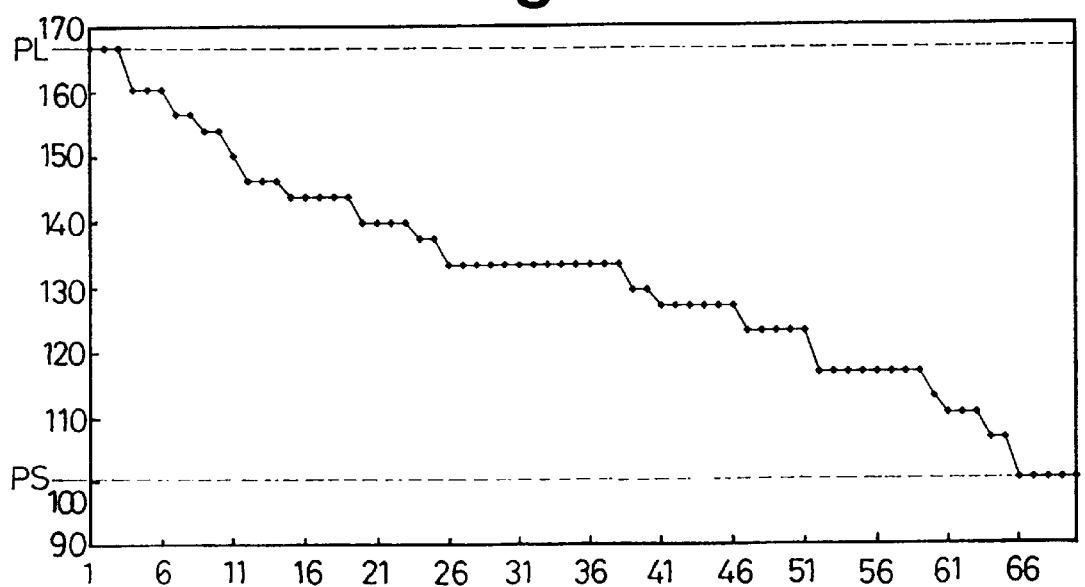

Fig. 19(A) Ex. 16
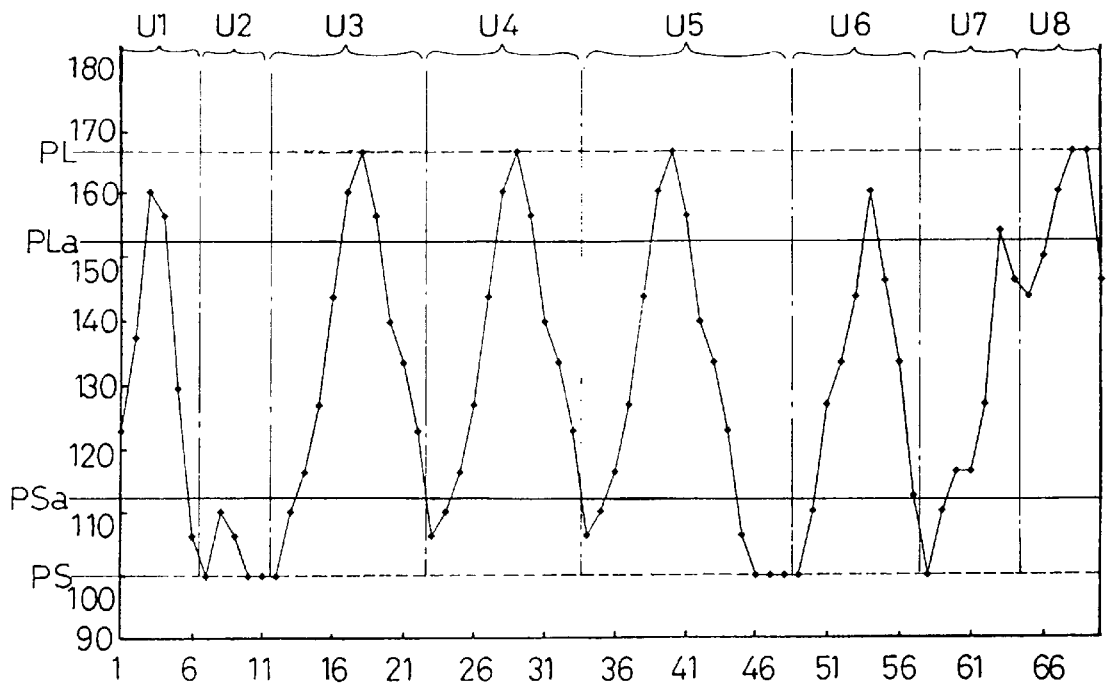
Fig. 19(B)
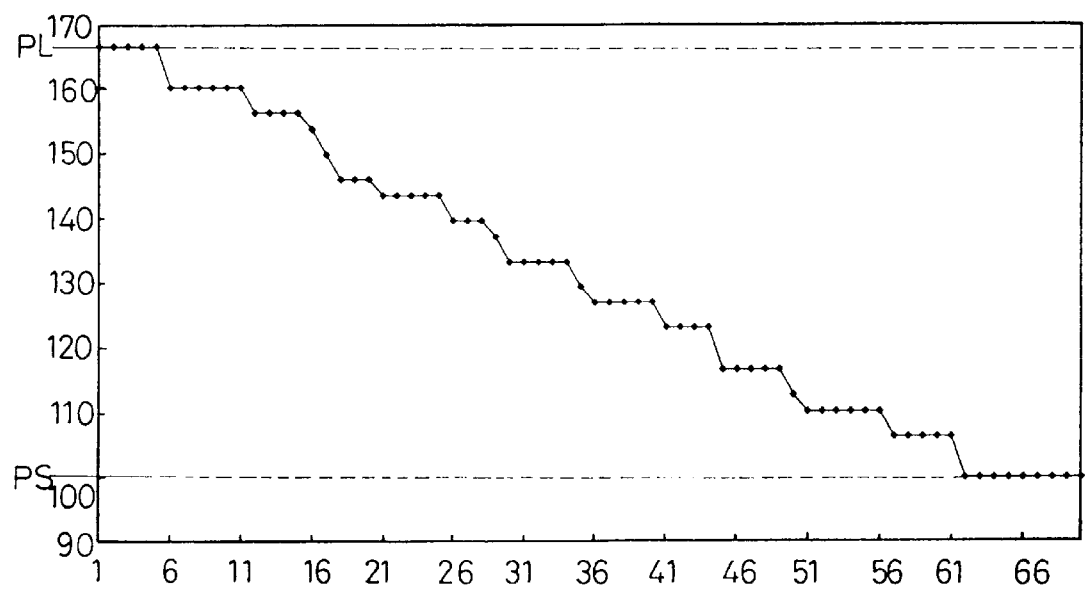

Fig. 20(A) Ref. 1
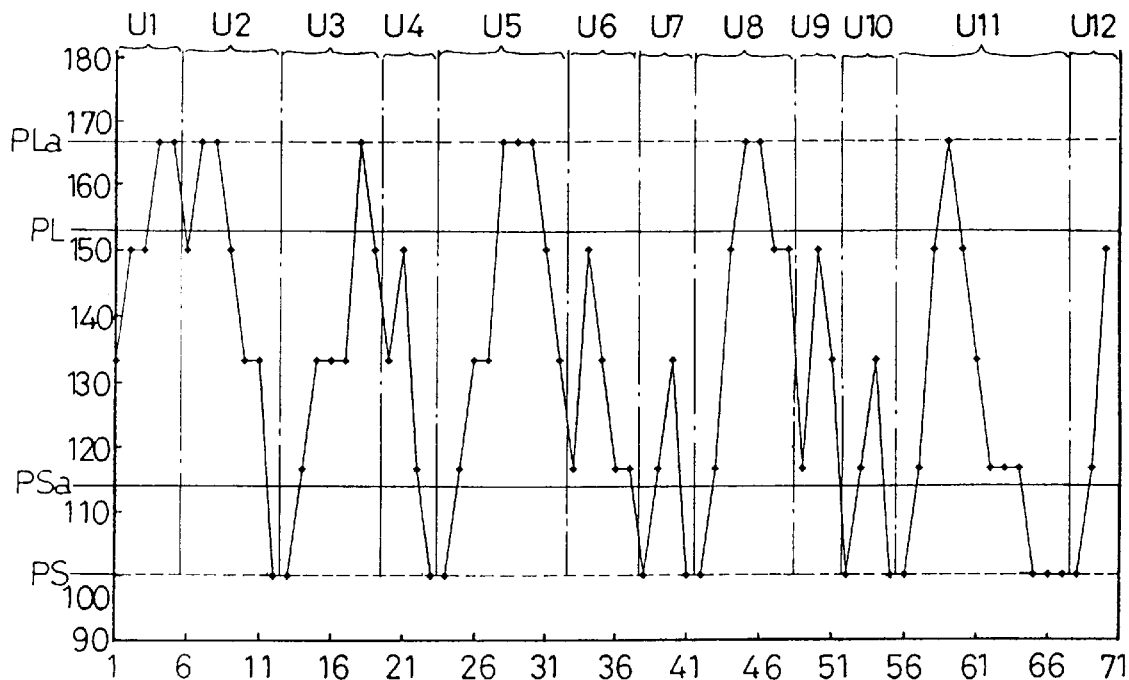
Fig. 20(B)
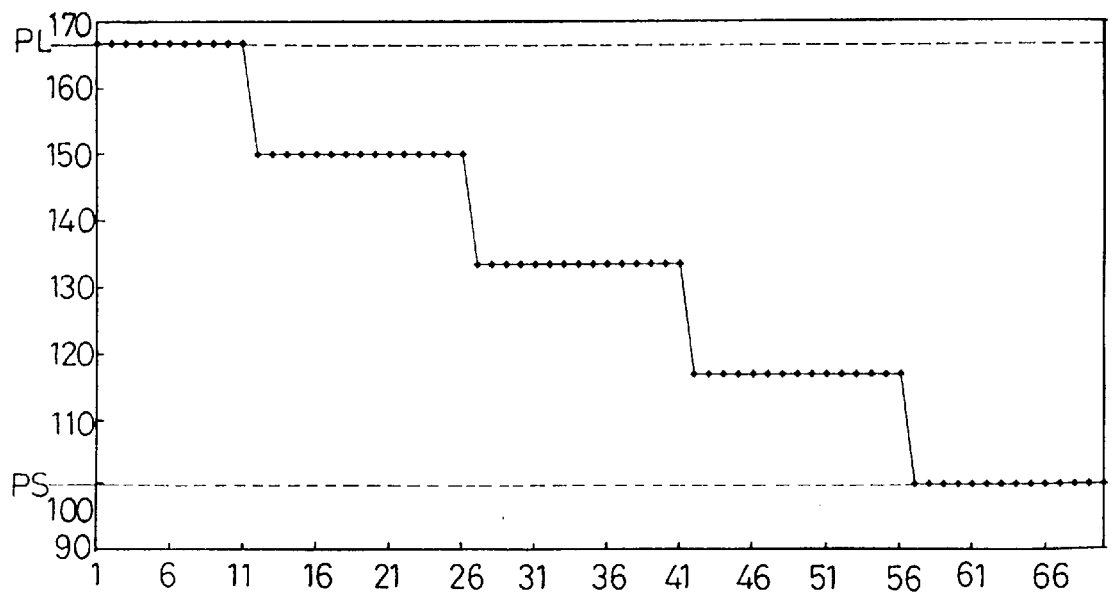

Fig. 21(A) Ref. 2
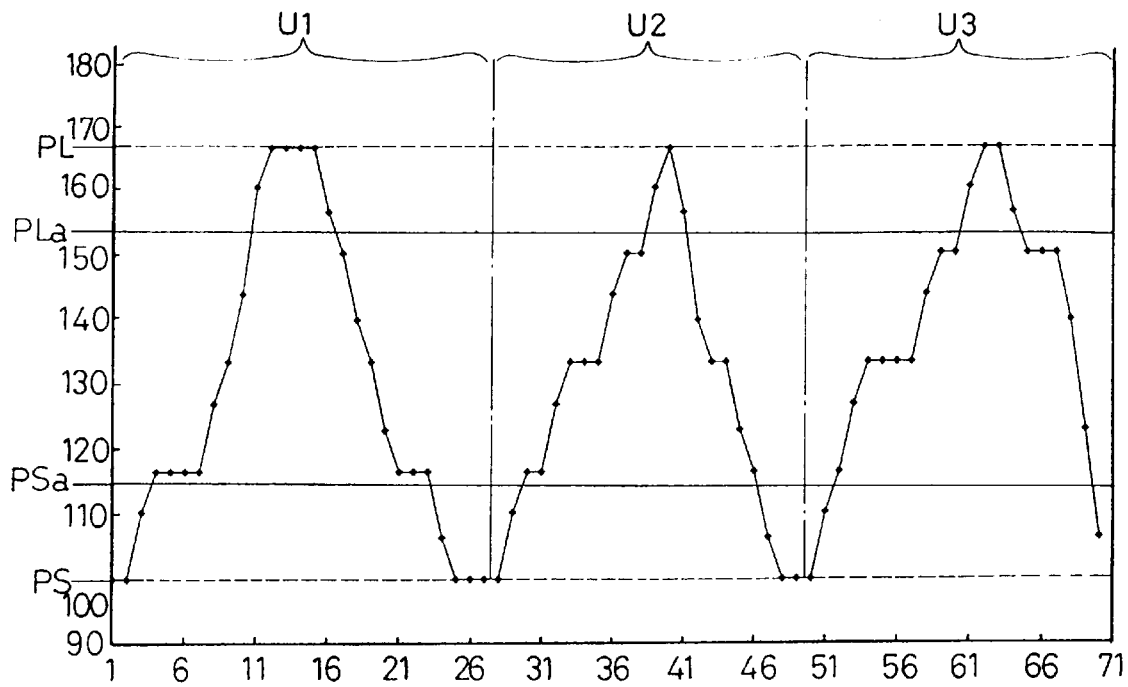
Fig. 21(B)
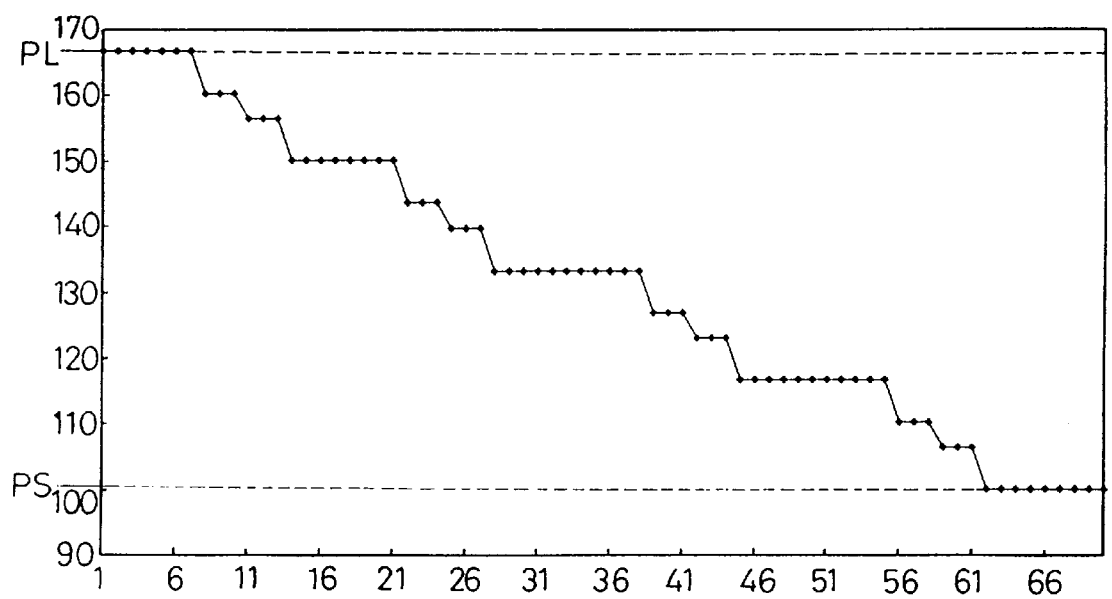

Fig. 22(A) Ref. 3
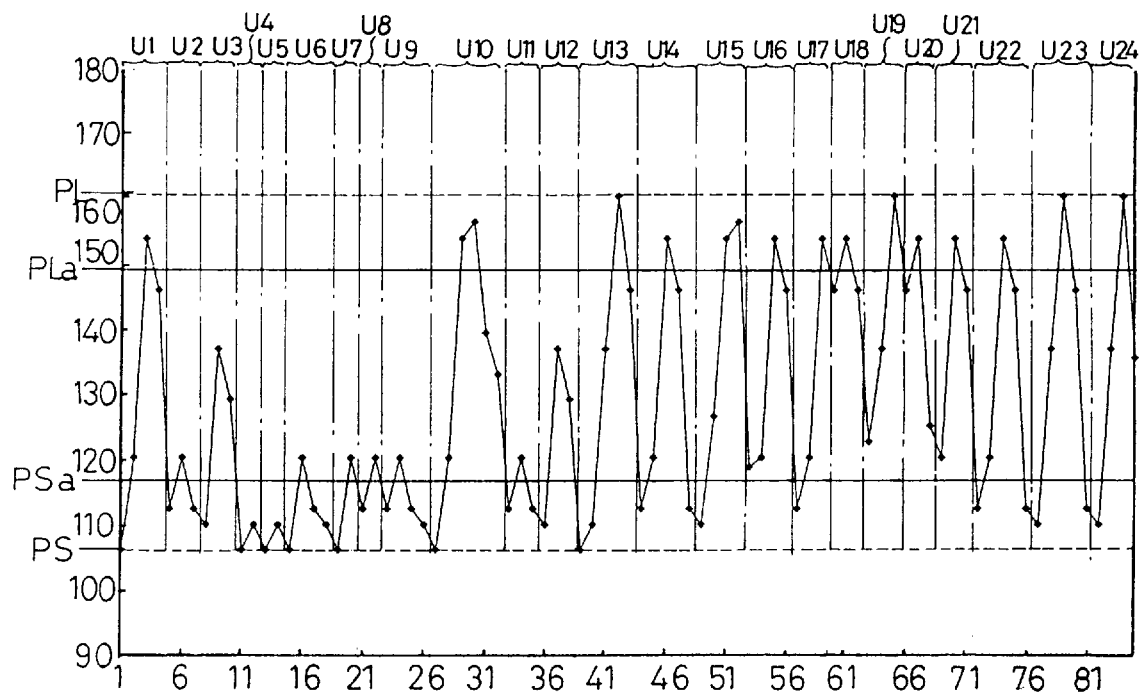
Fig. 22(B)
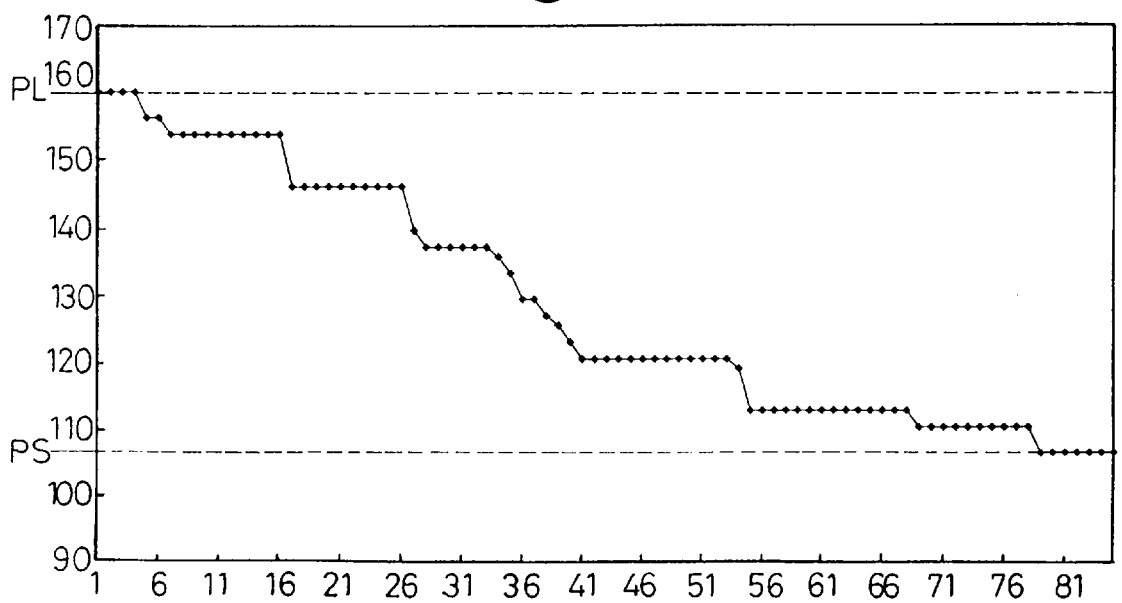

Fig. 23 (A) Ref. 4
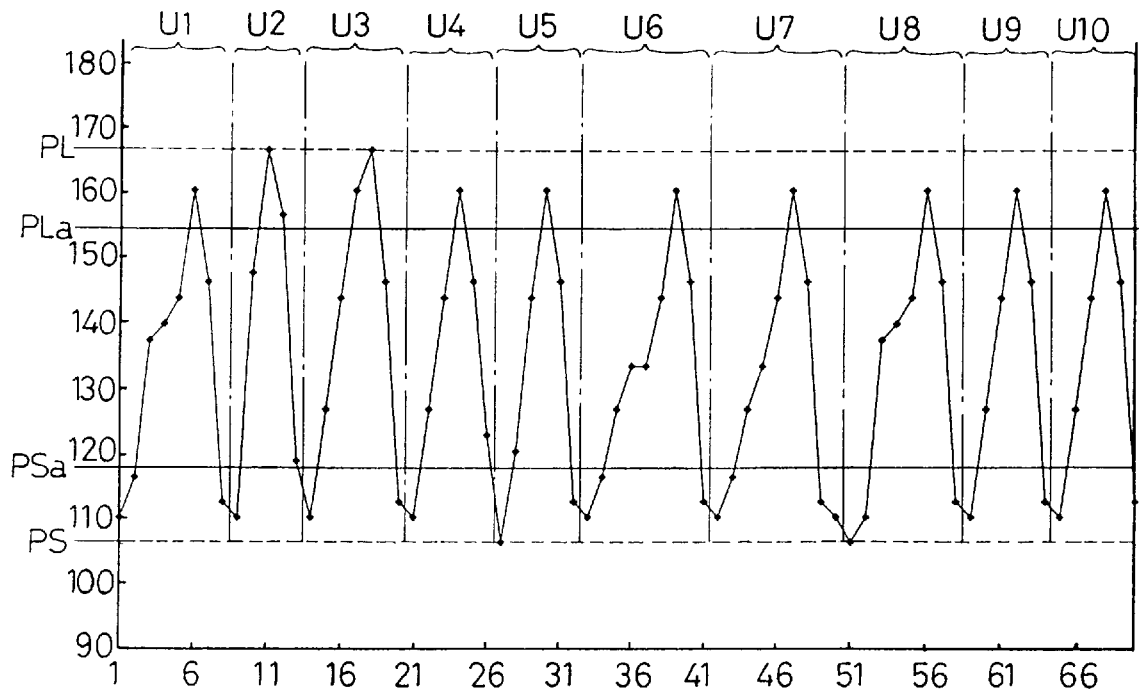
Fig. 23 (B)
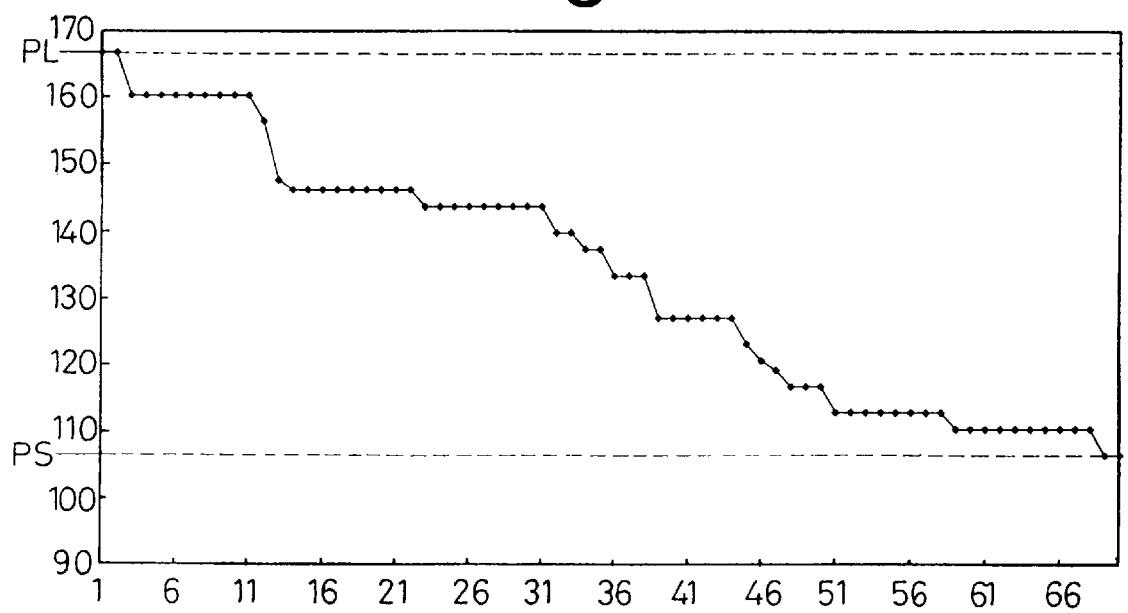

Fig. 24(A) Ref. 5
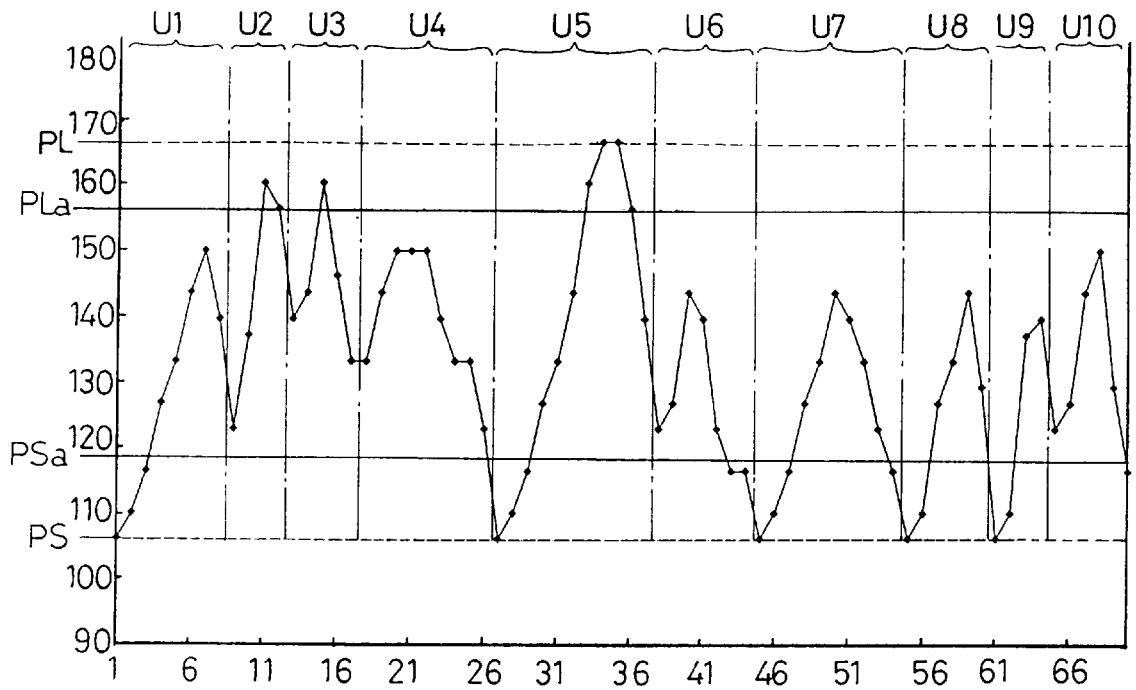
Fig. 24(B)
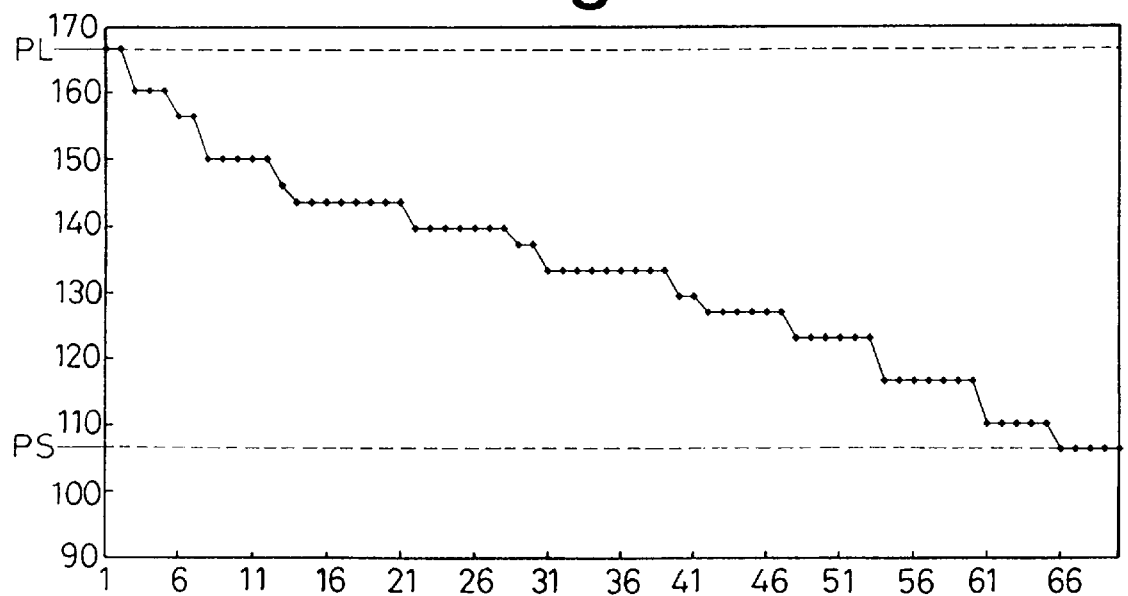

Fig. 25(A)    Ref. 6
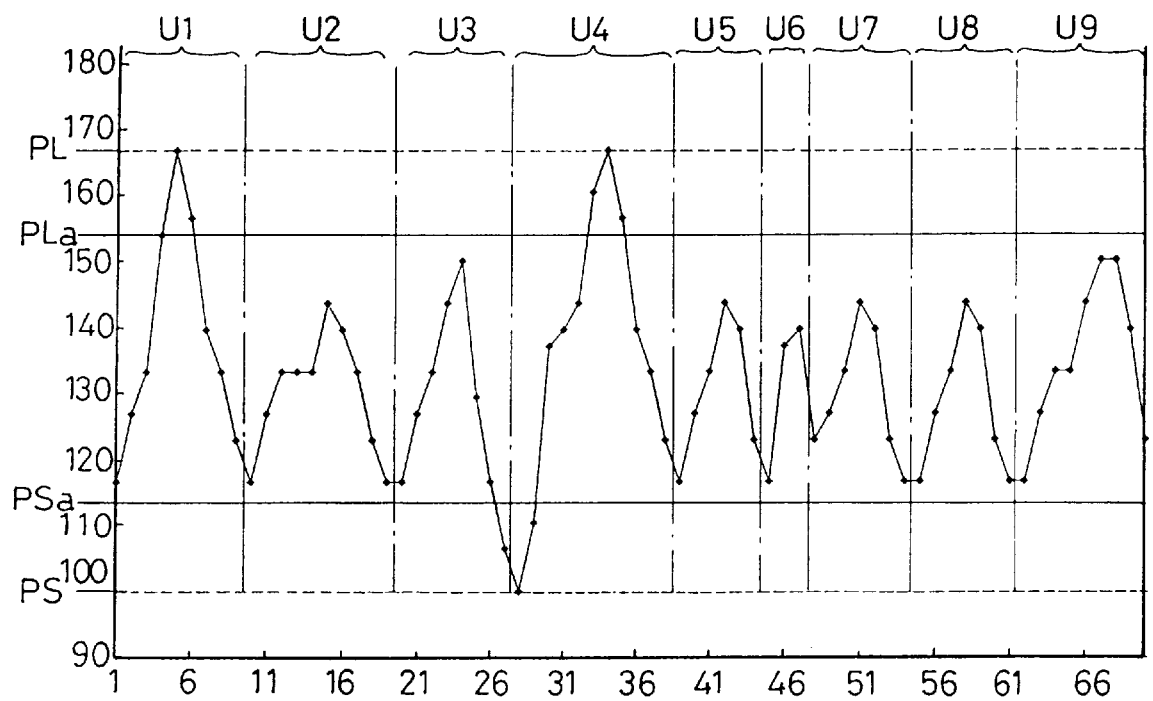
Fig. 25(B)
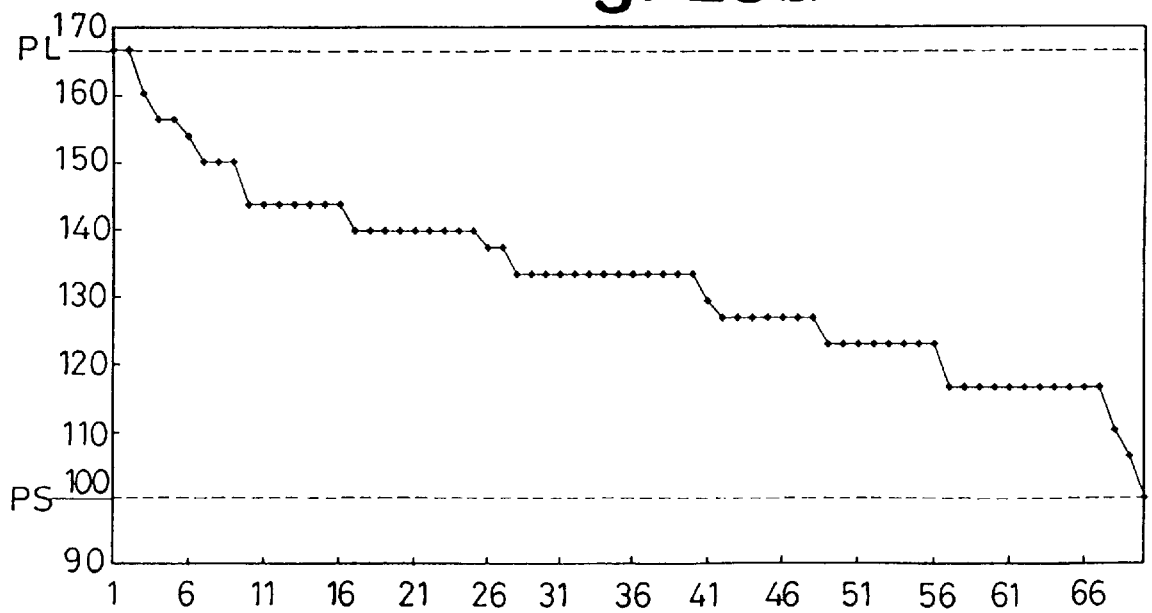

PNEUMATIC TIRE INCLUDING SEQUENCE

BACKGROUND OF THE INVENTION

1. Field of the Invention

The present invention relates to a pneumatic tire having an improved tread pattern to reduce pattern noise. More particularly, the present invention relates to an improvement in a variable pitching method.

2. Description of the Related Art

In general, tires are provided in the tread portion with circumferentially spaced tread elements constituting a tread pattern such as blocks for good road grip. During running, such tread elements contact with the road surface one after another, and a noisy sound called pattern noise is generated.

In order to reduce such pattern noise, the so called variable pitching methods have been proposed. In those methods, pattern noise is modulated into a wide frequency range so that the pattern noise turns to the so called white noise. For example, in laid-open Japanese patent application Nos. JP-A-8-108711, JP-A-8-113012 and JP-A-8-113013, such a method is disclosed.

In the variable pitching methods, by increasing the number of different pitches, it becomes easy to turn pattern noise to white noise. However, when the pitch number is large, the rigidity of the tread elements is liable to become uneven and uneven wear increases.

SUMMARY OF THE INVENTION

It is therefore, an object of the present invention to provide a pneumatic tire, in which the occurrence of uneven wear can be controlled in spite of a relatively large number of different pitches used therein to improve pattern noise.

According to one aspect of the present invention, a pneumatic tire comprises a tread portion provided with a series of design-cycles repeating in the circumference of the tire at variable pitches, wherein the number (NP) of different kinds of pitches is at least 10, said variable pitches repeating increase and decrease alternately in one circumferential direction of the tire to define start design-cycles from which the pitches starts to increase, said series of design-cycles composed of a series of units, each unit defined as a group of design-cycles starting from one of the start design-cycles inclusive to the next start-cycle exclusive, the total number of the units being in the range of from 4 to 20, the units consists of at least one first-unit the number of which is 20 to 80% of said total number, at least one second-unit the number of which is 20 to 80% of said total number, and optionally a third-unit the number of which is 0 to 60% of said total number, wherein the first unit is defined as including at least one pitch which is not less than a standard long pitch (PLa) and at least one pitch which is not more than a standard short pitch (PSa), the second unit is defined as including at least one pitch within one of the following two ranges, a range of not less than the standard long pitch (PLa) and a range of not more than the standard short pitch (PSa), but no pitch within the other range, the third unit is defined as all the pitches therein which are more than the standard short pitch (PSa) and less than the standard long pitch (PLa), the standard long pitch (PLa) is the maximum pitch (PL) minus a length of 0.2 times a maximum pitch difference (MPD), the standard short pitch (PSa) is the minimum pitch (PS) plus a length of 0.2 times the maximum pitch difference (MPD) and the maximum pitch difference (MPD) is the maximum pitch (PL) minus the minimum pitch (PS).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described in detail in conjunction with the accompanying drawings, in which:

FIG. 1 is a partial developed plan view of a pneumatic tire according to the present invention showing an example of the tread pattern;

FIG. 3 is a graph showing all of the pitches thereof in descending order;

FIGS. 4(a), 4(b), 5(a), 5(b), 6(a), 6(b), 7(a), 7(b), 8(a), 8(b), 9(a), 9(b), 10(a), 10(b), 11(a), 11(b), 12(a), 12(b), 13(a), 13(b), 14(a), 14(b), 15(a), 15(b), 16(a), 16(b), 17(a), 17(b), 18(a), 18(b), 19(a), 19(b) each show the pitch sequence and the pitches in descending order of Examples 1 to 16, respectively, of the present invention; and FIGS. 20(a), 20(b), 21(a), 21(b), 22(a), 22(b), 23(a), 23(b), 24(a), 24(b), 25(a), 25(b) each show the pitch sequence and the pitches in descending order of References 1 to 6, respectively.

DESCRIPTION OF THE PREFERRED EMBODIMENTS

Figures 2A, 2B:
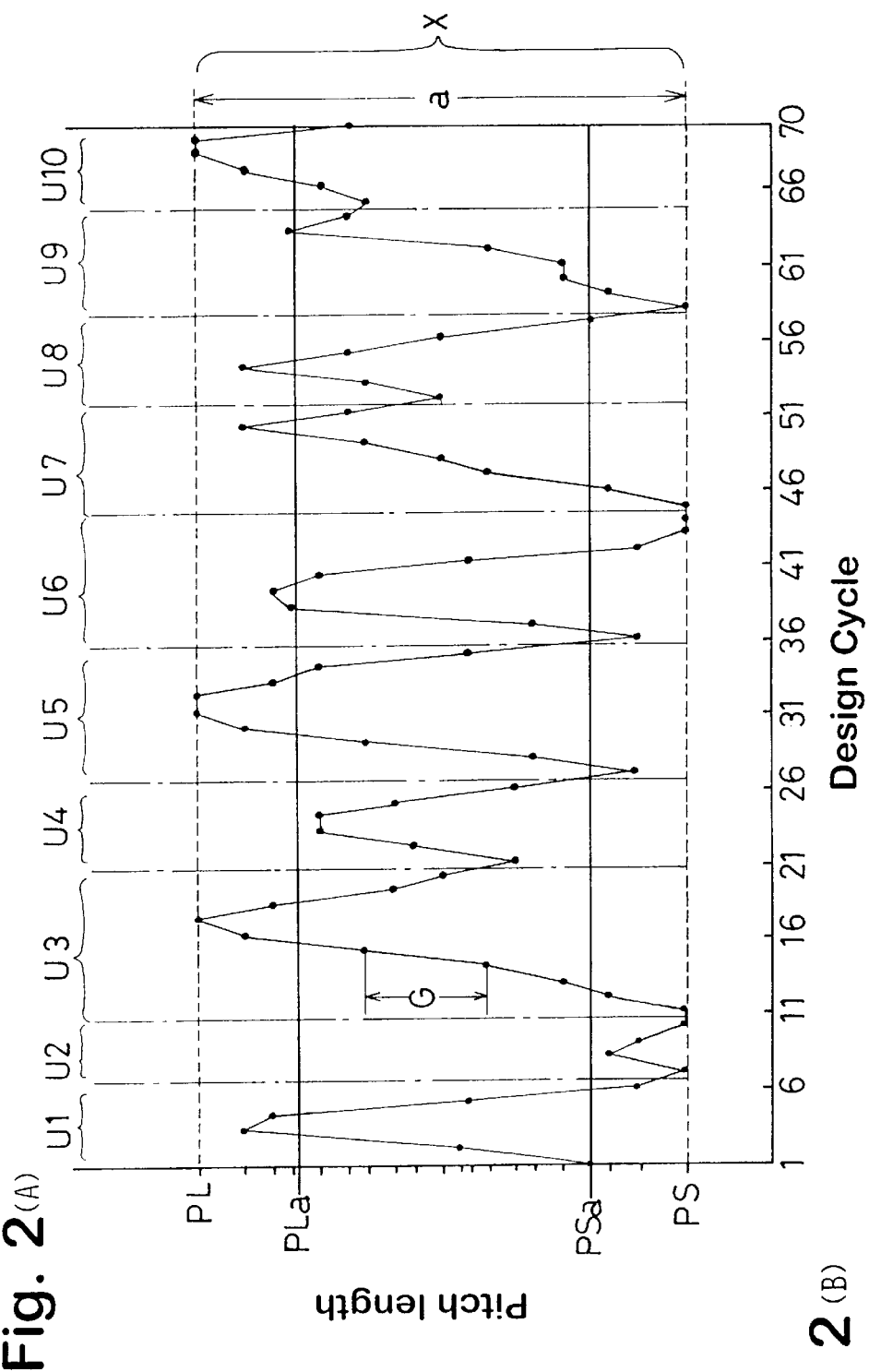
FIG. 2(a) is a graph and FIG. 2(b) is a chart showing the sequence of the pitches of the design-cycles (tread blocks) thereof in the tire circumferential direction.

The pneumatic tire according to the present invention comprises a tread portion 2, a pair of axially spaced bead portions, and a pair of sidewall portions extending between the tread edges and the bead portions. The tire may be reinforced by a carcass extending between the bead portions, a bead core disposed in each bead portion, and a belt disposed radially outside the carcass in the tread portion.

The tread portion 2 is provided with tread grooves 3 and 4 to form a tread pattern. The tread pattern comprises a series of design-cycles repeating in the circumference at variable pitches (L). The number (NC) of the design-cycles is preferably 50 to 90. The number (NP) of different kinds of pitches (L) is preferably at least 10. Further, the maximum pitch (PL) is preferably set in the range of from 120 to 170% of the minimum pitch (PS) for preventing uneven wear.

Taking an example shown in FIGS. 2 and 3, the pitch sequence according to the invention will now be explained. In FIG. 2, the design-cycle is indicated on the horizontal axis, and the pitch is indicated on the vertical axis.

In FIG. 2, from the first design-cycle to the last (70th) design-cycle, concretely along the tire circumferential direction, the pitches repeat increase and decrease alternately. Accordingly, there are a plurality of design-cycles (hereinafter start-cycles) from which the pitch starts to increase.

Here, using such start-cycles, a unit (U) is defined as a group of design-cycles starting from a start-cycle inclusive to the next start-cycle exclusive.

Accordingly, there is one peak of the pitches in each unit (U). In FIG. 2, for example, the 1st–6th cycles are unit U1, the 7th–10th cycles are unit U2, the 11th–20th cycles are unit U3, the 45th–51st cycles are unit U7, and there are ten units (U1 to U10) in this pitch sequence.

A pitch sequence is made up of 4 to 20 units, preferably 8 to 20 units, more preferably 9 to 13 units.

If the total number (NU) of the units is less than 4, periodicity is liable to happen in the pitch variation along the tire circumferential direction, and uncomfortable sound increases. If the total number (NU) of the units is more than 20, it is difficult to improve noise and uneven wear. It is especially difficult in a pneumatic tire comprising 50 to 90 design-cycles.

In the present invention, however, noise and uneven wear can be improved by using three types of units, the numbers of which are specifically limited in relation to the total number (NU).

First, a maximum pitch difference (MPD) is defined as the maximum pitch (PL) minus the minimum pitch (PS). A standard long pitch (PLa) is defined as the maximum pitch (PL) minus a length of 0.2 times the maximum pitch difference (MPD). Further, a standard short pitch (PSa) is defined as the minimum pitch (PS) plus a length of 0.2 times the maximum pitch difference (MPD).

The percentage D(%) in number, of the units of one type (hereinafter first unit), which is defined as including at least one pitch which is not less than the standard long pitch (PLa) and at least one pitch which is not more than the standard short pitch (PSa), is 20 to 80% of the total number of the units in a pitch sequence. In FIG. 2, for example, the first units are U1, U3, U5, U6, U7, U8 and U9. Thus percentage (D) is 70%.

The percentage R(%) in number, of the units of another type (herein after second unit), which is defined as including at least one pitch within one of the following two ranges, a range of not less than the standard long pitch (PLa) and a range of not more than the standard short pitch (PSa), but no pitch within the other range, is 20 to 80% of the total number of the units in a pitch sequence. In FIG. 2, for example, the second units are U2 and U10. Thus, the percentage (R) is 20%.

The percentage N(%) in number, of the units of the remaining type (hereinafter third unit), all the pitches of which are more than the standard short pitch (PSa) and less than the standard long pitch (PLa), is 0 to 60% of the total number of the units in a pitch sequence. In FIG. 2, for example, the third unit is U4 only, and the percentage (N) is 10%.

If the percentage (D) and/or (R) is less than 20% or the percentage (D) and/or (R) is more than 80%, pattern noise can not be reduced, though sometimes uneven wear can be prevented. Similarly, if the percentage (N) is more than 60%, the pattern noise can not be reduced.

In FIG. 3, all of the pitches in this sequence are plotted in descending order.

The difference (V) between any of the pitches and the next longer or shorter pitch is preferably set in the range of less than 6% of the average pitch (Pa). The average pitch (Pa) is defined as the total of all the pitches in the sequence divided by the number (=NC) of all the pitches. If the pitch difference (V) is more than 6% of the average pitch (Pa), the pitch variation is too wide, and the rigidity difference in the tread blocks becomes increased and uneven wear is liable to occur.

As mentioned above, the number of the different kinds of pitches is NP. Accordingly, the number of the variations thereof is (NP−1), a variation being a difference in length between two different kinds of pitches. And each variation is limited in the range of not less than 6% of the average pitch (Pa) because the pitch difference (V) is so limited as mentioned above.

The number (Nm) of variations (hereinafter normal variation) which are limited in the range of from 4 to 6% of the average pitch (Pa) is set in the range of not more than 40% of the total number (NP−1) of the variations. If the number (Nm) is more than 40% of (NP−1), the variations tend to have regularity which exerts a bad influence upon the noise frequency dispersion.

Additionally, when a plurality of third units exist in a pitch sequence, it is preferable that the third units do not adjoin each other in the tire circumferential direction. If the third units adjoin each other, the pitch dispersion is liable to become insufficient and the noise reducing effect decreases.

Further, it is preferable that of all the units are different from each other with respect to the sequence of the pitches in the unit. If the same units exist, the pitch sequence is liable to have regularity, and the noise frequency dispersion becomes worse.

Furthermore, the difference (G) between the pitches which are actually adjacent to each other in the tire circumferential direction is preferably set in the range of not more than 25% of the average pitch (Pa). If the actually adjacent pitches' difference (G) is more than 25% of the average pitch (Pa), the rigidity difference in the tread elements such as blocks tends to increase and uneven wear is liable to increase.

The above-mentioned pitch sequence is preferably applied to every circumferential row 6, 6a, 6b, 6c of blocks 5 in the tread portion 2, the blocks 5 circumferentially divided by axial grooves 4 and axially divided by circumferential grooves 3, the circumferential grooves 3 extending continuously in the tire circumferential direction.

In the example shown in FIG. 1, the tread portion 2 is provided with a pair of axially inner circumferential grooves 3a each disposed on each side of the tire equator (C), and a pair of axially outer circumferential grooves 3b disposed axially outside the inner grooves 3a.

The axial grooves 4 extend axially outward from the circumferential grooves 3a beyond the tread edges (E). The axial grooves 4 on each side of the tire equator are inclined to one circumferential direction. In FIG. 1, the inclining direction on one side is reverse to that on the other side. However, the inclination may be in the same direction to form a directionally bound tread pattern. The axial grooves 4 are arranged at regular or irregular intervals in the tire circumferential direction to form blocks therebetween. By the circumferential grooves 3b and axial grooves 4, a circumferential row 6a, 6b of blocks 5 is defined along each tread edge (E), which blocks have a generally parallelogram configuration. Further, by the circumferential grooves 3a and 3b and axial grooves 4, a circumferential row 6c of blocks 5 is defined.

Here, the circumferential grooves 3 and axial grooves 4 are grooves having a width of not less than 5 mm and a depth of not less than 7 mm.

In this example, sipes 9 are further provided on the blocks 5. the sipes 9 are slits having no substantial groove width, which are thus not taken into consideration.

One design-cycle is defined as a combination of one of the blocks 5 and one of the axial grooves 4 adjacent to the blocks on one side in the circumferential direction.

Each pitch (L) can be varied by changing only the circumferential length of the block 5 or only the circumferential width of the axial groove 4 or both of them.

For example, when the above-explained pitch sequence is applied to the block row 6a, the pitches (L) can be defined at the position of the circumferential groove 3b as shown in FIG. 1. Because the number (NC) is 50 to 90, each block row consists of 50 to 90 blocks divided by the same number of axial grooves. In the example shown in FIGS. 1–3, NC=70, NP=20, PL=37.8 mm, and PS=22.5 mm.

Comparison Tests

Test tires of size 205/70R15 were made and tested for noise and uneven wear as follows, using a 2000 cc passenger car of which all the wheels were provided with test tires. The specifications and test results are shown in Table 1.

A) Noise test

The sound heard in the test car when run on a smooth road surface of a test course at a speed of 60 km/h was evaluated by the test driver. The results are indicated by an index in which under 3.0 means that the sound was felt uncomfortable, and 3.0 or more means that it was not felt uncomfortable.

B) Uneven wear test

After running for 300 km in a test course, based on the decrease in the axial groove depth, the difference between the maximum wear and minimum wear was obtained as uneven wear.

From the test results, it was confirmed that the Example tires can be effectively reduced in the pattern noise.

In Example tire 10 in which the maximum of the pitch difference (V) exceeds greatly over 6% of the average pitch (Pa), uneven wear was caused.

When the number (NP) of different kinds of pitches is less than 10 (Ref.1), or the total number (NU) of the units is less than 4 (Ref.2), or the total number (NU) of the units is more than 20 (Ref.3), the pattern noise can not be reduced even if the special percentages for the three types of units are employed.

Contrary, when the percentages of the three types of units are outside the above-mentioned ranges, the noise can not be reduced even if the numbers (NP) and (NU) satisfy the above-mentioned ranges (Ref.4 and Ref.6).

As described above, in the pneumatic tires according to the present invention, as the percentages of the first to third units are specifically limited, pattern noise and uneven wear can effectively be improved.

The present invention is suitably applied to passenger car tires, but it is also possible to apply to heavy duty tires for trucks, buses and the like, motorcycle tires, and so on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Tire | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Design cycle | | | | | | | | | | | | | | | | |
| NC | 70 | 70 | 70 | 80 | 70 | 70 | 70 | 70 | 70 | 70 | 70 | 70 | 70 | 70 | 70 | 70 |
| Pitch | | | | | | | | | | | | | | | | |
| FIG. No. | 4 | 5 | 6 | 7 | 8 | 9 | 10 | 11 | 12 | 13 | 14 | 15 | 16 | 17 | 18 | 19 |
| NP | 19 | 10 | 13 | 17 | 15 | 17 | 15 | 15 | 10 | 10 | 11 | 11 | 21 | 19 | 18 | 16 |
| Nm | 2 | 5 | 8 | 1 | 3 | 3 | 3 | 5 | 9 | 0 | 4 | 8 | 2 | 2 | 2 | 3 |
| Nm/NP-1 (%) | 11 | 56 | 67 | 7 | 21 | 19 | 21 | 36 | 100 | 0 | 40 | 80 | 10 | 11 | 12 | 20 |
| PL/PS (%) | 167 | 167 | 167 | 167 | 157 | 157 | 154 | 167 | 153 | 153 | 164 | 167 | 167 | 167 | 167 | 167 |
| Max. V/Pa (%) | 5 | 11 | 5 | 6 | 7 | 5 | 5 | 5 | 6 | 24 | 8 | 11 | 5 | 5 | 5 | 5 |
| Max. G/Pa (%) | 25 | 32 | 12 | 25 | 28 | 28 | 20 | 20 | 19 | 25 | 21 | 20 | 31 | 25 | 21 | 21 |
| Unit | | | | | | | | | | | | | | | | |
| NU | 9 | 13 | 4 | 20 | 10 | 10 | 10 | 10 | 9 | 9 | 9 | 9 | 10 | 9 | 10 | 8 |
| 1st unit | 7 | 6 | 3 | 4 | 8 | 4 | 2 | 2 | 7 | 5 | 7 | 5 | 7 | 5 | 2 | 6 |
| D (%) | 78 | 46 | 75 | 20 | 80 | 40 | 20 | 20 | 78 | 56 | 78 | 56 | 70 | 56 | 20 | 75 |
| 2nd unit | 2 | 7 | 1 | 14 | 2 | 5 | 7 | 2 | 2 | 4 | 2 | 4 | 3 | 3 | 2 | 2 |
| R (%) | 22 | 54 | 25 | 70 | 20 | 50 | 70 | 20 | 22 | 44 | 22 | 44 | 30 | 33 | 20 | 25 |
| 3rd unit | 0 | 0 | 0 | 2 | 0 | 1 | 1 | 6 | 0 | 0 | 0 | 0 | 0 | 1 | 6 | 0 |
| N (%) | 0 | 0 | 0 | 10 | 0 | 10 | 10 | 60 | 0 | 0 | 0 | 0 | 0 | 11 | 60 | 0 |
| Noise | 3 | 3 | 3 | 3 | 3 | 3 | 3 | 3 | 3 | 3 | 3 | 3 | 3 | 3 | 3 | 3 |
| Uneven wear* | GD | GD | GD | GD | GD | GD | PR | GD | GD | PR | GD | GD | GD | GD | GD | GD |

| Tire | Reference | | | | | |
|---|---|---|---|---|---|---|
| | 1 | 2 | 3 | 4 | 5 | 6 |
| Design cycle | | | | | | |
| NC | 70 | 70 | 85 | 70 | 70 | 70 |
| Pitch | | | | | | |
| FIG. No. | 20 | 21 | 22 | 23 | 24 | 25 |
| NP | 5 | 13 | 17 | 17 | 15 | 16 |

TABLE 1-continued

|  | | | | | | |
|---|---|---|---|---|---|---|
| Nm | 0 | 8 | 2 | 2 | 4 | 5 |
| Nm/NP-1 (%) | 0 | 67 | 12 | 13 | 29 | 33 |
| PL/PS (%) | 167 | 167 | 167 | 160 | 157 | 167 |
| Max. V/Pa (%) | 13 | 5 | 6 | 7 | 5 | 5 |
| Max. G/Pa (%) | 25 | 12 | 29 | 28 | 20 | 20 |
| Unit | | | | | | |
| NU | 12 | 3 | 24 | 10 | 10 | 9 |
| 1st unit | 5 | 3 | 9 | 10 | 1 | 1 |
| D (%) | 42 | 100 | 38 | 100 | 10 | 11 |
| 2nd unit | 5 | 0 | 15 | 0 | 8 | 2 |
| R (%) | 42 | 0 | 62 | 0 | 80 | 22 |
| 3rd unit | 2 | 0 | 0 | 0 | 1 | 6 |
| N (%) | 16 | 0 | 0 | 0 | 10 | 67 |
| Noise | 2.8 | 3 | 3 | 3 | 3 | 3 |
| Uneven wear* | GD | GD | GD | GD | GD | GD |

*GD = good, PR = poor.

What is claimed is:

1. A pneumatic tire comprising:

a tread portion, the tread portion provided with a series of design-cycles repeating in the circumference of the tire at variable pitches to define a sequence, wherein the variable pitches include a maximum pitch (PL) and a minimum pitch (PS) and the number (NP) of different kinds of pitches is at least 10, said variable pitches alternately increasing and decreasing in one circumferential direction of the tire to define start design-cycles from which the pitches start to increase, said series of design-cycles composed of a series of units, each unit defined as a group of design-cycles starting from one of the start design-cycles inclusive to the next start-cycle exclusive, the total number of the units being in the range of from 4 to 20, the units consist of at least one first-unit the number of which is 20 to 80% of said total number, at least one second-unit the number of which is 20 to 80% of said total number, and a plurality of third-units the number of which is 60% or less of said total number, each of the plurality of third-units not adjoining each other in the tire circumferential direction, wherein the first unit is defined as including at least one pitch which is not less than a standard long pitch (PLa) and at least one pitch which is not more than a standard short pitch (PSa), the second unit is defined as including at least one pitch within one of a first range of not less than the standard long pitch (PLa) and a second range of not more than the standard short pitch (PSa), but not including a pitch within the other range, the third unit is defined as all the pitches therein are more than the standard short pitch (PSa) and less than the standard long pitch (PLa), the standard long pitch (PLa) is the maximum pitch (PL) minus a length of 0.2 times a maximum pitch difference (MPD), the standard short pitch (PSa) is the minimum pitch (PS) plus a length of 0.2 times the maximum pitch difference (MPD), the maximum pitch difference (MPD) is the maximum pitch (PL) minus the minimum pitch (PS), and a number (Nm) of variations in the pitches, which variations are limited in the range of from 4 to 6% of an average pitch (Pa), is set in the range of not more than 40% of a total number of the variations, a variation being a difference in length between two different kinds of pitches, the average pitch (PA) being the sum of the length of all of the pitches in the sequence, divided by the number of pitches in the sequence and the total number of variations being the number of different kinds of pitches minus 1.

2. The pneumatic tire according to claim 1, wherein a difference (V) between any of the pitches and the next longer or shorter pitch is in the range of less than 6% of an average pitch (Pa), the average pitch (Pa) being the sum of the lengths of all of the pitches in the sequence, divided by the number of pitches in the sequence.

3. The pneumatic tire according to claim 1, wherein all the units are different from each other with respect to a sequence of the pitches therein.

4. The pneumatic tire according to claim 1, wherein a difference (G) between pitches which adjoin each other in the tire circumferential direction is not more than 25% of an average pitch (Pa), wherein the average pitch (Pa) is the sum of the lengths of all of the pitches in the sequence divided by the number of pitches in the sequence.

5. The pneumatic tire according to claim 1, wherein said tread portion is provided with at least one row of blocks which are circumferentially divided by axial grooves, and each said design-cycle is defined by one of the blocks and one of the axial grooves adjacent thereto on one side thereof.

* * * * *